(12) United States Patent
Sasaki et al.

(10) Patent No.: US 10,412,370 B2
(45) Date of Patent: Sep. 10, 2019

(54) PHOTOGRAPHING DEVICE AND VEHICLE

(71) Applicant: Kabushiki Kaisha Toshiba, Tokyo (JP)

(72) Inventors: Takayuki Sasaki, Tokyo (JP); Yusuke Moriuchi, Tokyo (JP); Nao Mishima, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 146 days.

(21) Appl. No.: 15/443,318

(22) Filed: Feb. 27, 2017

(65) Prior Publication Data

US 2017/0353710 A1    Dec. 7, 2017

(30) Foreign Application Priority Data

Jun. 7, 2016 (JP) .................................. 2016-113465

(51) Int. Cl.
*H04N 13/25* (2018.01)
*H04N 13/243* (2018.01)
(Continued)

(52) U.S. Cl.
CPC ............. *H04N 13/25* (2018.05); *B60R 1/00* (2013.01); *G01C 3/08* (2013.01); *G01C 3/18* (2013.01);
(Continued)

(58) Field of Classification Search
CPC ...... B60K 2350/1028; B60K 2350/106; B60R 1/00; B60R 2300/105; B60R 2300/107;
(Continued)

(56) References Cited

U.S. PATENT DOCUMENTS 6,025,790 A * 2/2000 Saneyoshi ............ G05D 1/0251
340/946
6,118,475 A 9/2000 Iijima et al.
(Continued)

FOREIGN PATENT DOCUMENTS

JP     8-43055       2/1996
JP     2010-220177   9/2010
(Continued)

OTHER PUBLICATIONS

Takeda, Y. et a. (2013). "Integration of Depth from Defocus and Stereo Using Coded Aperture," *The IEICE Transactions on Information and Systems (Japanese Edition)*, D. J96-D(8); pp. 1688-1700.

*Primary Examiner* — Farzana Hossain
(74) *Attorney, Agent, or Firm* — Finnegan, Henderson, Farabow, Garrett & Dunner, L.L.P.

(57) ABSTRACT

A photographing device includes a first image sensor, a first filter area, a second image sensor, a first distance calculating unit, and a second distance calculating unit. The first image sensor includes a first sensor receiving light of a first wavelength band and outputting a target image, and a second sensor receiving light of a second wavelength band and outputting a reference image. The first filter area transmits a first light of a third wavelength band, which includes at least part of the first wavelength band, the first light being a part of light incident on the first image sensor. The second image sensor outputs a first image. The first distance calculating unit calculates a first distance to an object captured in the target image and the reference image. The second distance calculating unit calculates a second distance to an object captured in the reference image and the first image.

23 Claims, 19 Drawing Sheets

(51) Int. Cl.
*G06T 7/73* (2017.01)
*B60R 1/00* (2006.01)
*G02B 5/20* (2006.01)
*H04N 7/18* (2006.01)
*G06T 7/55* (2017.01)
*H04N 13/257* (2018.01)
*H04N 13/271* (2018.01)
*H04N 13/239* (2018.01)
*G01C 3/08* (2006.01)
*G01C 3/18* (2006.01)
*H04N 13/00* (2018.01)

(52) U.S. Cl.
CPC ............... *G02B 5/201* (2013.01); *G06T 7/55* (2017.01); *G06T 7/74* (2017.01); *H04N 7/181* (2013.01); *H04N 7/183* (2013.01); *H04N 13/239* (2018.05); *H04N 13/243* (2018.05); *H04N 13/257* (2018.05); *H04N 13/271* (2018.05); *B60K 2370/12* (2019.05); *B60K 2370/1438* (2019.05); *B60K 2370/152* (2019.05); *B60K 2370/21* (2019.05); *B60R 2300/105* (2013.01); *B60R 2300/107* (2013.01); *B60R 2300/8093* (2013.01); *G06T 2207/10016* (2013.01); *H04N 2013/0077* (2013.01); *H04N 2013/0081* (2013.01)

(58) Field of Classification Search
CPC ............ B60R 2300/8093; G02B 5/201; G06T 2207/10016; G06T 7/55; G06T 7/74; H04N 13/243; H04N 13/25; H04N 7/181; H04N 7/183

USPC ....................... 348/42, 47, 48, 148
See application file for complete search history.

(56) References Cited

U.S. PATENT DOCUMENTS

| | | | | |
|---|---|---|---|---|
| 2012/0327189 | A1* | 12/2012 | Muramatsu | G01C 3/06 348/46 |
| 2014/0118341 | A1* | 5/2014 | Shimizu | G06T 3/4038 345/419 |
| 2014/0293055 | A1* | 10/2014 | Otsuka | B60Q 1/143 348/148 |
| 2015/0036917 | A1* | 2/2015 | Nanri | G06T 7/0075 382/154 |
| 2015/0049913 | A1* | 2/2015 | Zhong | G06T 7/60 382/104 |
| 2015/0151725 | A1* | 6/2015 | Clarke | B60W 30/00 701/28 |
| 2015/0186734 | A1* | 7/2015 | Nakagawa | G06K 9/00791 382/104 |
| 2015/0279045 | A1* | 10/2015 | Zhong | G06K 9/6212 382/154 |
| 2016/0154152 | A1 | 6/2016 | Moriuchi et al. | |
| 2016/0210735 | A1* | 7/2016 | Fukushima | G06K 9/00805 |
| 2016/0311443 | A1* | 10/2016 | Hong | H04N 13/106 |
| 2017/0054910 | A1 | 2/2017 | Moriuchi et al. | |
| 2017/0074651 | A1* | 3/2017 | Akimoto | G01C 3/06 |
| 2017/0132824 | A1* | 5/2017 | Otsuka | H04N 5/232 |
| 2017/0366802 | A1* | 12/2017 | Hirasawa | G03B 17/12 |

FOREIGN PATENT DOCUMENTS

| | | |
|---|---|---|
| JP | 2016-102733 | 6/2016 |
| JP | 2017-40642 | 2/2017 |

\* cited by examiner

FIG.3
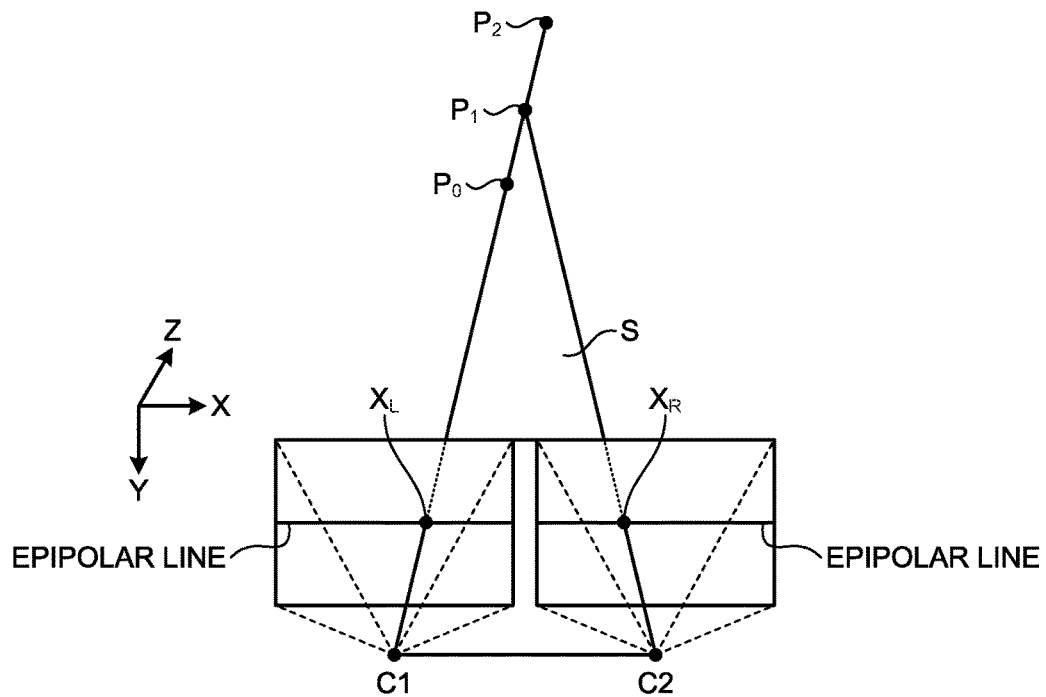
FIG.4
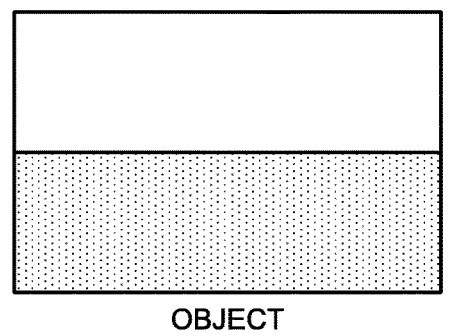
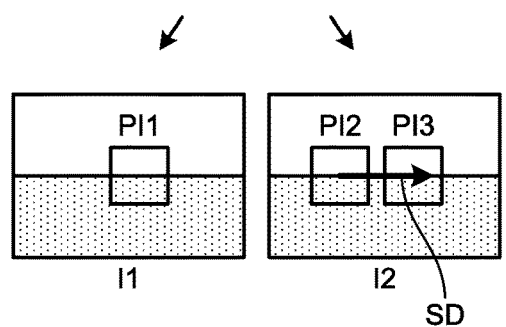

CHANGE ACCORDING TO DISTANCE |d|

CAMERA IMAGE

PHOTOGRAPHING DEVICE AND VEHICLE

CROSS-REFERENCE TO RELATED APPLICATIONS

This application is based upon and claims the benefit of priority from Japanese Patent Application No. 2016-113465, filed on Jun. 7, 2016; the entire contents of which are incorporated herein by reference.

FIELD

Embodiments described herein relate generally to a photographing device and a vehicle.

BACKGROUND

A technology is known in which distance information is obtained from two images that are captured from different positions. In that technology, for example, images in which an object is captured are captured using two cameras installed at different positions. Moreover, from the two images, the correspondence relationship between the pixels having the same feature is obtained; and the distance to the object is obtained from the parallax amount and the positional relationship according to the principle of triangulation. As a result of calculating the distance with respect to all features, the distance information can be obtained from the two images.

However, in the conventional technology, there are times when the distance information cannot be obtained with a high degree of accuracy. For example, if a plurality of identical features is distributed on a straight line parallel to an epipolar plane, there is no difference among the features and thus the correspondence relationship becomes indeterminate. That makes it difficult to obtain the distance.

BRIEF DESCRIPTION OF THE DRAWINGS

FIG. 3 is a diagram for explaining a search method in which the epipolar geometry is used;

FIG. 4 is a diagram for explaining the issues faced in stereoscopy;

DETAILED DESCRIPTION

According to one embodiment, a photographing device includes a first image sensor, a first filter area, a second image sensor, a first distance calculating unit, and a second distance calculating unit. The first image sensor includes a first sensor receiving light of a first wavelength band and outputting a target image, and a second sensor receiving light of a second wavelength band and outputting a reference image. The first filter area transmits a first light of a third wavelength band, which includes at least part of the first wavelength band, the first light being a part of light incident on the first image sensor. The second image sensor outputs a first image. The first distance calculating unit calculates a first distance to an object captured in the target image and the reference image. The second distance calculating unit calculates a second distance to an object captured in the reference image and the first image.

Exemplary embodiments of a photographing device according to the invention are described below in detail with reference to the accompanying drawings.

First Embodiment

A photographing device according to a first embodiment performs distance calculation according to stereoscopy in which two image sensors are used, as well as calculates distance from a single image sensor according to the depth from defocus (DFD) method. In the DFD method according to the first embodiment, the distance is calculated based on the difference in the defocusing shape of a plurality of sensor images generated by two or more sensors that receive light of different wavelength bands. Herein, a plurality of filters that transmit light of different wavelength bands is assumed to be lined in a different direction than (for example, in the orthogonal direction to) the direction of the baseline of stereoscopy. That enables calculation of the distance with a higher degree of accuracy.

Figure 1:
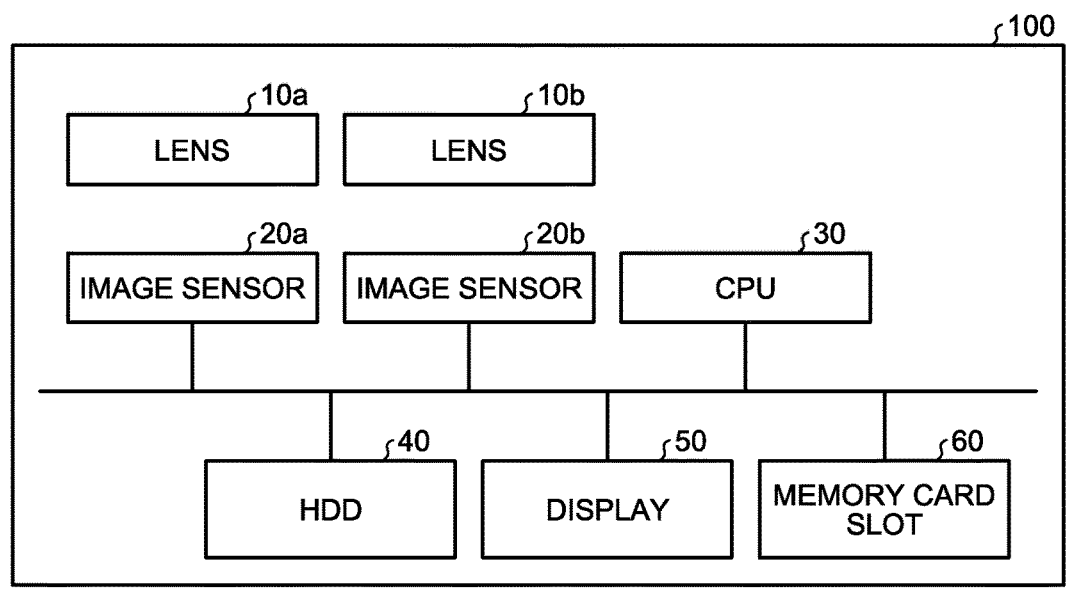
FIG. 1 is a hardware configuration diagram of a photographing device according to a first embodiment.

FIG. 1 is block diagram illustrating an exemplary hardware configuration of a photographing device 100 according to the first embodiment. As illustrated in FIG. 1, the photographing device 100 includes lenses 10a and 10b, an image sensor 20a (a first image sensor), an image sensor 20b (a second image sensor), a central processing unit (CPU) 30, a hard disk drive (HDD) 40, a display 50, and a memory card slot 60.

The image sensors 20a and 20b, the CPU 30, the HDD 40, the display 50, and the memory card slot 60 are connected to each other by a bus, for example. The photographing device 100 captures an image to capture an arbitrary object serving as the target for photography, and generates distance information containing the distance to the object.

The lens 10a includes a filter (a color filter) on which falls the light that is reflected from the object as a result of photographing, and which transmits the incident light. For example, in the lens 10a, at the time of collection of the incident light, the light of a particular wavelength band passes through according to the color of the filter. The light that has passed through the filter then reaches the image sensor 20a. Thus, regarding a plurality of types of sensor images captured by the image sensor 20a, the shape of the point spread function (PSF) is subject to change because of the filter.

The image sensor 20a receives the light that has passed through the lens 10a. For example, the image sensor 20a includes two or more sensors that receive light of mutually different wavelength bands (a first wavelength band and a second wavelength band); and generates a target image, which has which the point spread function changed in a point asymmetric manner due to the passage of light through the filter, and a reference image, which represents a sensor image of one type or more. The first wavelength band may include a part of the second wavelength band. Herein, two or more sensors indicate, for example, two or more combinations of RGB sensors, such as a combination of R and G sensors, a combination of G and B sensors, a combination of R and B sensors, and a combination of R, G, and B sensors. For example, from among the two or more sensors, one sensor (a sensor 121 or a first sensor) generates the target image, and the other sensor (a sensor 122 or a second sensor) generates the reference images. The light receiving surface of the image sensor 20a has the pixels of each sensor arranged thereon in an even manner.

Examples of the image sensor 20a include a CCD image sensor (CCD stands for Charge Coupled Device) and a CMOS image sensor (CMOS stands for Complementary Metal Oxide Semiconductor). As one form, the image sensor 20a includes a sensor for receiving the light of red color (an R sensor), a sensor for receiving the light of green color (a G sensor), and a sensor for receiving the light of blue color (a B sensor); receives the light of the wavelength bands corresponding to the sensors; and generates captured images (an R image, a G image, and a B image).

Meanwhile, the lens 10a can have an aperture. Moreover, the filter can be installed in any one optical system of the photographing device 100. For example, the optical systems of the photographing device 100 indicate the lens 10a and the image sensor 20a. Thus, the filter can be installed inside the lens or at the aperture of the lens, or can be installed in between the lens 10a and the image sensor 20a. At the time of collection of the incident light, the light of a particular wavelength band passes through according to the color of the filter. The following explanation is given for an example in which the filter is installed at the aperture of the lens 10a.

The aperture has an arbitrary aperture size $\Phi$ (where $0<\Phi\leq\Phi MAX$ holds true, and $\Phi MAX$ represents the maximum diameter of the aperture) and has origin symmetry. By adjusting the aperture size, it becomes possible to adjust the amount of light falling on the image sensor 20a. For example, a mechanism for enabling the user to physically adjust the size can be installed in the lens. Moreover, software (an application) can be installed in a computer or a handheld device, and information can be input by the user to the photographing device 100 via the computer or the handheld device.

On the lens 10b falls the light reflected from the object as a result of photographing, and the lens 10b outputs the light to the image sensor 20b. Herein, the image sensor 20b includes sensors for receiving light of arbitrary wavelength bands. Examples of the image sensor 20b include a CCD image sensor or a CMOS image sensor. As one form, the image sensor 20b includes a sensor for receiving the light of red color (an R sensor), a sensor for receiving the light of green color (a G sensor), and a sensor for receiving the light of blue color (a B sensor); receives the light of the wavelength bands corresponding to the sensors; and generates captured images (an R image, a G image, and a B image). Alternatively, the image sensor 20b can be an image sensor including at least one of the R sensor, the G sensor, and the B sensor.

The CPU 30 comprehensively controls the operations of the photographing device 100. More particularly, the CPU 30 executes computer programs stored in the HDD 40, and controls the operations of the entire photographing device 100. For example, the CPU 30 refers to the captured images generated by the image sensors 20a and 20b, calculates a distance image indicating the distance to the object, and generates distance information. Moreover, the CPU 30 refers to the captured images and the distance image, and generates a display image to be presented to the user.

The HDD 40 is a nonvolatile memory device of the rewritable type. For example, the HDD 40 is used to store computer programs, which are related to the control of the photographing device 100, and a variety of data. Herein, either instead of using the HDD 40 or in addition to using the HDD 40, it is possible to use another memory medium such as a random access memory (RAM), a read only memory (ROM), or a NAND-type flash memory (where NAND stands for inverted AND).

The memory card slot 60 is an interface for a portable memory medium. For example, in the memory card slot 60, it is possible to insert a portable memory medium such as an SD memory card (where SD stands for Secure Digital) or an SDHC memory card (where SDHC stands for SD High-Capacity). The display 50 is used to display a variety of information or images (such as captured images and distance images). Examples of the display 50 include a liquid crystal display and a touch-sensitive panel.

Figure 2:
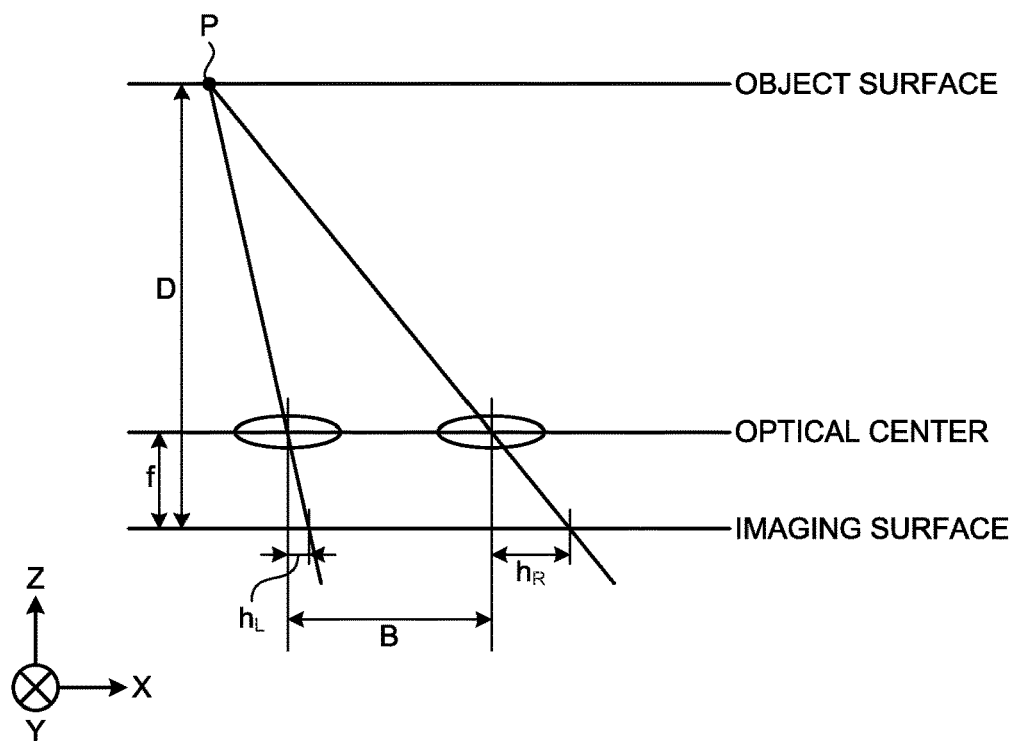
FIG. 2 is a diagram illustrating a method for obtaining a distance according to triangulation.

Explained below with reference to FIG. 2 is a method for obtaining the distance to the object according to the triangulation from two cameras. In FIG. 2 is illustrated a condition in which two cameras (referred to as cameras C1 and C2) observe a particular point P having three-dimensional coordinates. For ease of explanation, it is assumed that the cameras C1 and C2 have the same orientation and are separated from each other by a certain baseline length B in the X-axis direction. A distance D to the cameras C1 and C2 is calculated according to the following equation using photographing positions $h_R$ and $h_L$, of the cameras and a focal length f of the cameras.

$$(h_R - h_L) : f = B : (D - f)$$

In order to obtain the distance D from the equation given above, the parallax $(h_R - h_L)$ on the imaging surface needs to be detected. Examples of the method for obtaining the correspondence between the left-side camera images and the right-side camera images mainly include full search template matching and a search method using epipolar constraints. If the epipolar geometry is used, the search time can be reduced by a large margin as compared to a full search. In the epipolar geometry, when a point present in the three-dimensional space is captured by the left-side camera and the right-side camera, the projection of that point in one camera is restricted to the straight line on which the other camera is present. The plane including the three-dimensional point to be obtained and including the camera positions is called the epipolar plane. An epipolar lines corresponding to the epipolar plane is projected onto each camera image.

Explained below with reference to FIG. 3 is a search method in which the epipolar geometry is used. Consider a case in which, for a point $\lambda_L$ in the camera C1, the corresponding point in the camera C2 is searched. If it is assumed that the positions and the orientations of the camera C1 and C2 are known, the point in the three-dimensional space of the point $\lambda_L$ can be restricted to be on the straight line joining the position of the camera C1 and the point $\lambda_L$. For example, all points on that straight line (for example, points $P_0$, $P_1$, and $P_2$) are projected onto the camera C2, and the point having the smallest right-and-left matching costs from among the projected points becomes the point $\lambda_R$ corresponding to the point $\lambda_L$. In the example illustrated in FIG. 3, the point $P_1$ is obtained as the point on the straight line corresponding to the point $\lambda_R$.

Herein, an epipolar plane S represents the plane including the position of the camera C1, the point P1, and the position of the camera C2. The line on which the camera C2 and the epipolar plane S intersect is the epipolar line. Regarding the camera C1 too, the epipolar line can be obtained in an identical manner. Thus, by performing one-dimensional search of epipolar lines, the correspondence of points can be achieved at a high speed.

In stereoscopy, there is a feature that the distance information cannot be obtained in principle. Explained below with reference to FIG. 4 are the issues faced in stereoscopy. Assume that a pattern having horizontal edges as illustrated in FIG. 4 is photographed, and assume that the position of such a partial image in a camera image 12 is obtained which corresponds to a partial image PI1 in a camera image I1. In that case, if a search is performed in a search direction SD, a plurality of identical features (in the example illustrated in FIG. 4, horizontal edges) is present on the epipolar plane. Hence, the correspondence cannot be fixed in a unique manner, and the distance becomes indeterminate. In FIG. 4, partial images PI2 and PI3 are illustrated as exemplary images that may correspond to the partial image PI1.

In stereoscopy, this is one of the problems, in principle, independent of the differences in the positions and the orientations of the left-side camera and the right-side camera. In this way, the feature on the epipolar plane is that the distance cannot be obtained in principle in stereoscopy.

In the first embodiment, using an image captured by at least one of the cameras of a stereo camera, distance estimation equivalent to stereoscopy is performed with respect to a different direction than the baseline length direction of the stereo. As a result, it becomes possible to perform distance estimation of the features that were not detected in the past. That enables achieving a high degree of accuracy in obtaining the distance.

Figure 5:
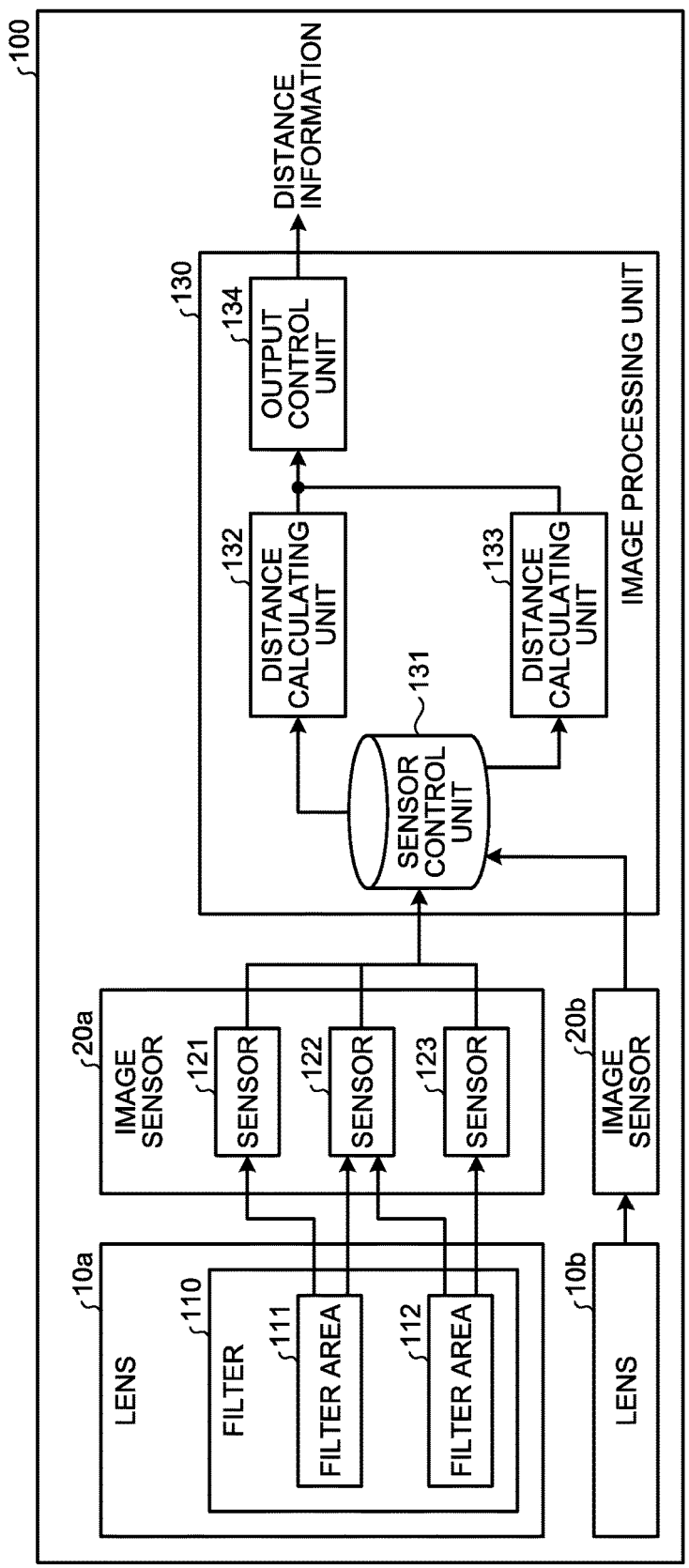
FIG. 5 is a functional block diagram of the photographing device according to the first embodiment.

FIG. 5 is a block diagram illustrating an exemplary functional configuration of the photographing device 100 according to the first embodiment. As illustrated in FIG. 5, the photographing device 100 includes the lenses 10a and 10b, the image sensors 20a and 20b, and an image processing unit 130.

The lens 10a includes a filter 110 at the aperture, for example. The filter 110 has a filter area 111 (a first filter area) for transmitting light of a particular wavelength band. Moreover, the filter 110 can include a filter area 112 (a second filter area). On the filter area 111 falls a part of the entire light falling on the lens or the aperture, and the light of only a particular wavelength band passes through the filter area 111. For example, the filter area 111 transmits light of a third wavelength band that includes at least a part of the first wavelength band. The light that has passed through the filter area 111 represents a part of the light falling on the image sensor 20a.

On the filter area 112 falls a part of the entire light falling on the lens or the aperture, and only the light of a particular wavelength band passes through the filter area 112. For example, the filter area 112 transmits light of a fourth wavelength band that includes at least a part of the second wavelength band. The light that has passed through the filter area 112 represents a part of the light falling on the image sensor 20a. The filter area 111 is, for example, a yellow filter (Y filter) for transmitting light of red color and light of green color. The filter area 112 is a filter for transmitting light of a different wavelength band than the filter area 111. However, the combination of colors of the light passing through the filter areas 111 and 112 is not limited to the example given herein.

At the time of collection of light incident thereon, the lens 10a transmits light of a particular wavelength band according to the color of the filter 110. The light that has passed through the filter 110 and the lens 10a reaches the image sensor 20a.

The image sensor 20a receives the light that has passed through the lens 10a and the filter 110. The image sensor 20a includes sensors 121, 122, and 123. For example, the sensors 121, 122, and 123 represent an R sensor, a G sensor, and a B sensor, respectively. Based on the light received by these sensors, the image sensor 20a outputs a first sensor image that includes the reference images and the target image mentioned above. The details of the reference images and the target image are given later.

The lens 10b collects the light incident thereon and outputs the collected light to the image sensor 20b. The image sensor 20b receives the light that has passed through the lens 10b. Based on the received light, the image sensor 20b outputs a second sensor image (a first image).

The image processing unit 130 includes a sensor control unit 131, a distance calculating unit 132 (a first distance calculating unit), a distance calculating unit 133 (a second distance calculating unit), and an output control unit 134. Part or all of the sensor control unit 131, the distance calculating units 132 and 133, and the output control unit 134 either can be implemented by causing one or more processors such as a central processing unit (CPU) to execute a computer program, that is, implemented as software, can be implemented as hardware such as one or more integrated circuits (IC), or can be implemented as a combination of software and hardware. The following explanation is given for an example in which the image sensor 20a as well as the image sensor 20b includes RGB sensors. However, the wavelength bands of the sensors are not limited to this example.

The sensor control unit 131 controls the image sensor 20a and obtains the target image, which has the point spread function changed in a point asymmetric manner, and a reference image, which represents a sensor image of one type or more.

The distance calculating unit 132 receives input of the first sensor image, calculates the distance to the object captured in the image, and outputs distance information (a first distance image) indicating the distance. For example, the distance calculating unit 132 calculates the distance to the object by obtaining, from among a plurality of defocusing correction kernels, the defocusing correction kernel for which the degree of correlation between a corrected image, which represents the target image with defocusing added thereto, and the reference images becomes the highest; and outputs a first distance image. Herein, the defocusing correction kernels represent functions for adding mutually different defocusing to the target image.

The distance calculating unit 133 receives input of the first sensor image and the second sensor image, calculates the distance to the object captured in the images, and outputs a distance image (a second distance image) indicating the distance.

The output control unit 134 receives input of the first distance image and the second distance image, and generates and outputs distance information. Herein, the distance information indicates the distance to the object as obtained based on the distances (the distance images) obtained by the distance calculating units 132 and 133. In the distance information, the information that the distance calculating unit 132 could not obtain due to the epipolar plane issue is offset with the information obtained by the distance calculating unit 133. Alternatively, in the distance information, the information that the distance calculating unit 133 could not obtain due to the epipolar plane issue is offset with the information obtained by the distance calculating unit 132. Meanwhile, for example, the distance information can be an image formed by taking the weighted average of the first distance image and the second distance image, or can be information containing the first distance image and the second distance image. Alternatively, information containing the data of distance images in the form of a list structure can be output as the distance information. Still alternatively, the distance information can be a numerical value indicating the distance.

Figure 6:
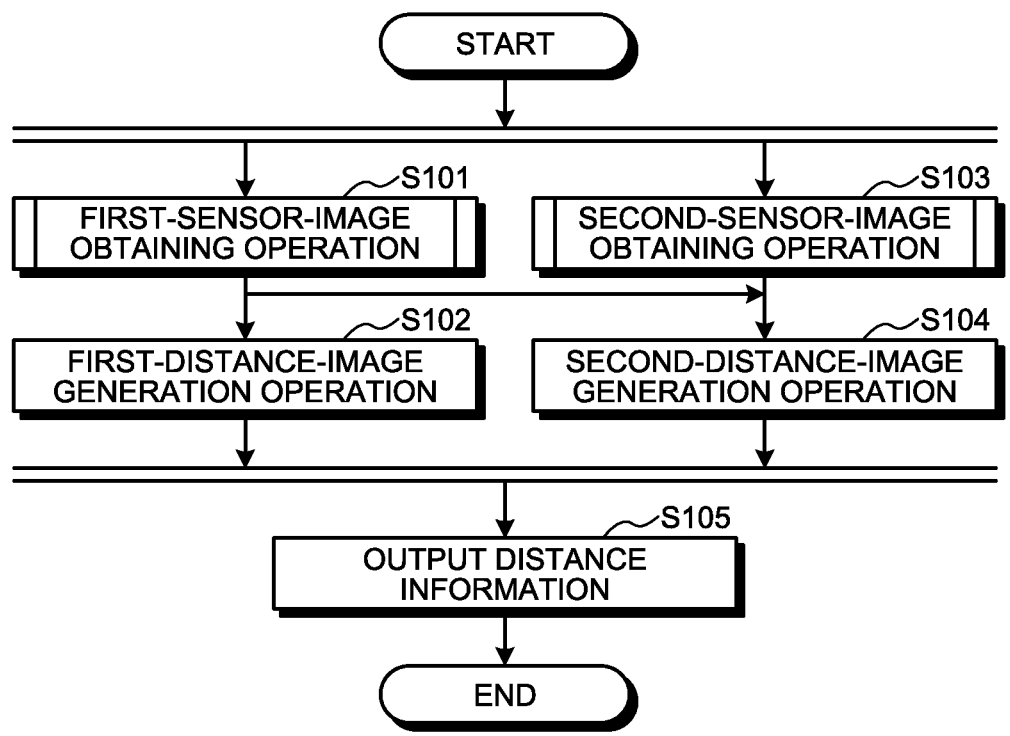
FIG. 6 is a flowchart for explaining the image processing performed according to the first embodiment.

Explained below with reference to FIG. 6 is the image processing performed by the photographing device 100 configured in the abovementioned manner according to the first embodiment. FIG. 6 is a flowchart for explaining an example of the image processing performed according to the first embodiment. The following explanation is given for an example in which the image sensor 20a as well as the image sensor 20b includes RGB sensors. However, the wavelength bands of the image sensors 20a and 20b are not limited to this example.

Firstly, a first-sensor-image obtaining operation is performed for obtaining the image generated by the lens 10a and the image sensor 20a (Step S101). Then, a first-distance-image generation operation is performed for generating a distance image based on the first sensor image (Step S102). The details of the first-sensor-image obtaining operation and the first-distance-image generation operation are given later.

Along with the operations performed at Steps S101 and S102, a second-sensor-image obtaining operation is performed for obtaining the image generated by the lens 10b and the image sensor 20b (Step S103). In the second-sensor-image obtaining operation, the image sensor 20b receives the light that has passed through the lens 10b, and generates and outputs a second sensor image.

Subsequently, a second-distance-image generation operation is performed for generating a distance image based on the first sensor image and the second sensor image (Step S104). In the second-distance-image generation operation, the distance calculating unit 133 performs stereo ranging (stereo matching) using the baseline length between the image sensors 20a and 20b, the first sensor image, and the second sensor image; obtains the distance to the cameras (the image sensors 20a and 20b) on a pixel-by-pixel basis; and generates a second distance image.

The output control unit 134 receives input of the first distance image and the second distance image, and generates and outputs distance information (Step S105).

Figure 7:
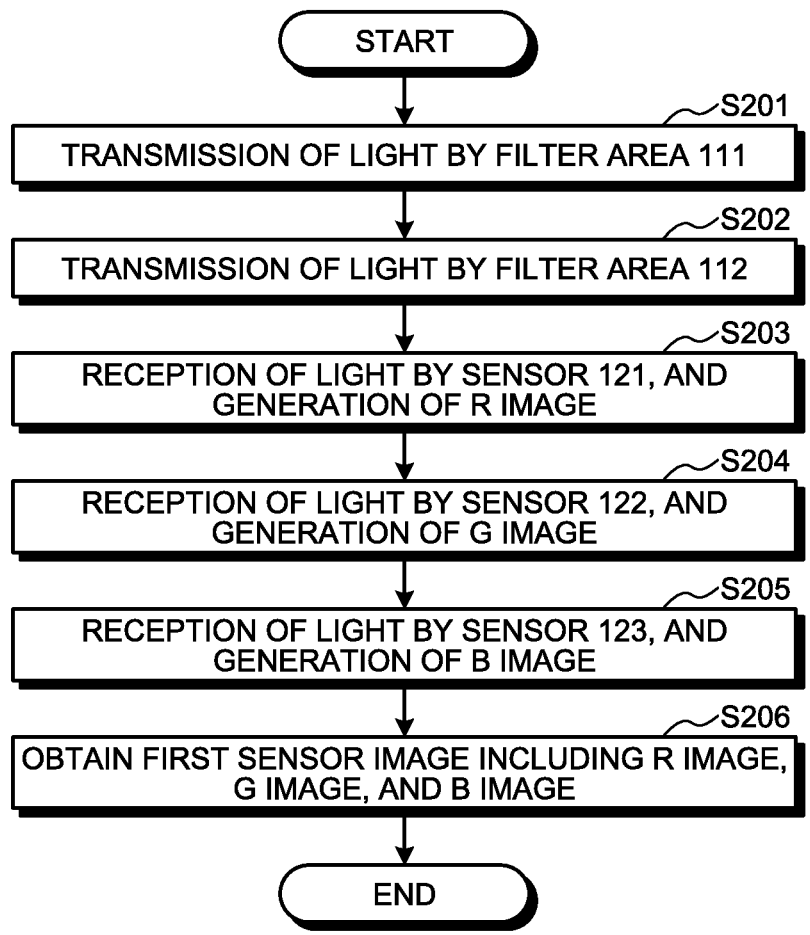
FIG. 7 is a flowchart for explaining a first-sensor-image obtaining operation performed according to the first embodiment.

FIG. 7 is a flowchart for explaining an example of the first-sensor-image obtaining operation performed according to the first embodiment. The following explanation is given for an example in which the filter area 111 is a Y filter and the filter area 112 is a three-color transmission filter.

Firstly, the filter area 111 (the Y filter) transmits the light of red color and the light of green color (Step S201). The filter area 112 transmits the light of red color, the light of green color, and the light of blue color (Step S202).

The sensor 121 receives the light of red color and generates an R image representing one of the sensor images (Step S203). The sensor 122 receives the light of green color and generates a G image representing one of the sensor images (Step S204). The sensor 123 receives the light of blue color and generates a B image representing one of the sensor images (Step S205).

The sensor control unit 131 obtains a first sensor image that includes the R image generated by the sensor 121, the G image generated by the sensor 122, and the B image generated by the sensor 121 (Step S206).

Figure 8:
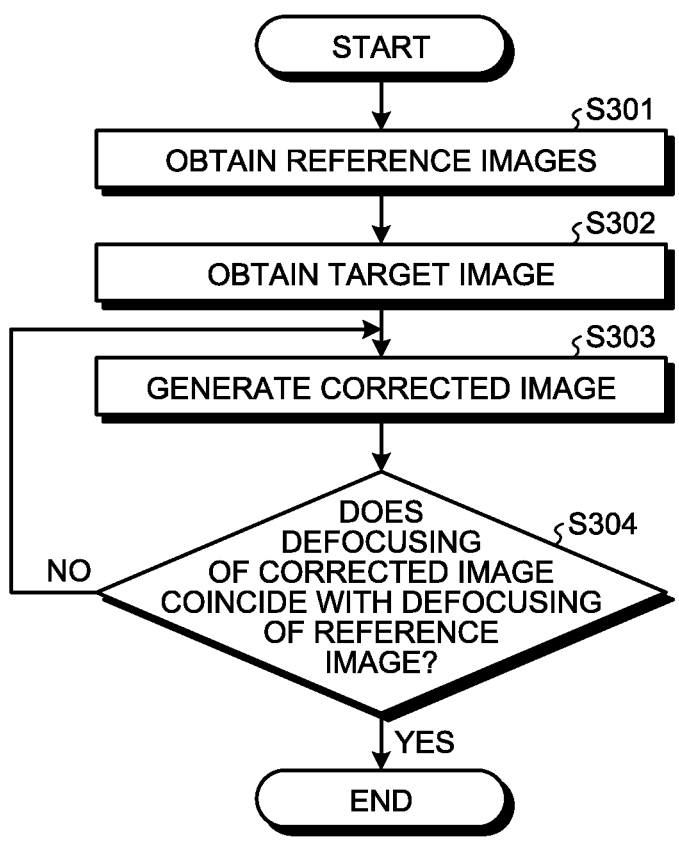
FIG. 8 is a flowchart for explaining a first-distance-image generation operation performed according to the first embodiment.

Given below is the explanation of the first-distance-image generation operation in which the reference images and the target image included in the first sensor image are used along with using the first sensor image. FIG. 8 is a flowchart for explaining an example of the first-distance-image generation operation performed according to the first embodiment.

Firstly, the light reflected from the object as a result of photographing passes through the filter 110. As a result, the point spread function of the sensor image of one type or more, from among the sensor images observed by the image sensor 20a, is changed in a point asymmetric manner. The filter areas of the filter 110 can attenuate the light of arbitrary types from among the light received by the image sensor 20a and can cause bias in the distribution of light beam collection, and can change the point spread function of the sensor images.

Figure 9:
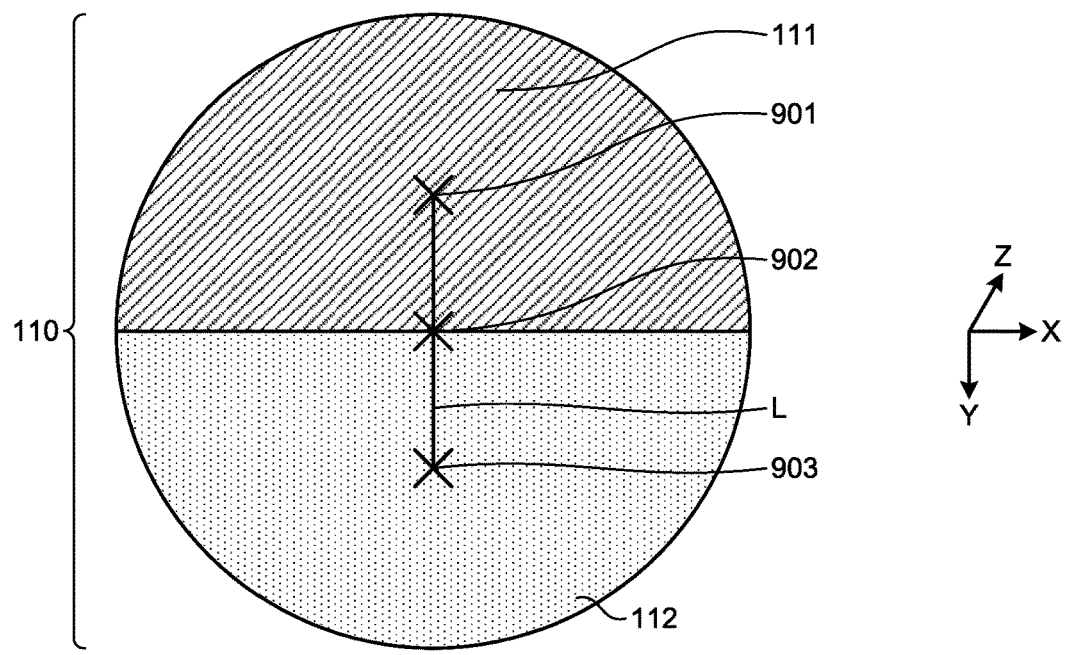
FIG. 9 is a diagram illustrating an exemplary configuration of filter areas according to the first embodiment.

FIG. 9 is a diagram illustrating an exemplary configuration of the filter areas according to the first embodiment. As illustrated in FIG. 9, of the filter areas of the filter 110, the filter area 111 is formed not to have point symmetry when a center point 902 of the filter areas (the point at the position of the center of gravity) representing the optical center serves as the point of symmetry. In the example illustrated in FIG. 9, of the filter areas, the yellow filter (Y filter) is assumed to be the filter area 111, and the filter area other than the filter area 111 is assumed to be the filter area 112. That is, when the optical center serves as the point of symmetry, the yellow filter (Y filter) representing the filter area 111 does not have point symmetry. The filter area 112 is assumed to be a filter for transmitting the light of red color, the light of green color, and the color of blue color. In an identical manner to the filter area 111, when the optical center serves as the point of symmetry, the filter area 112 does not have point symmetry.

Given below is the explanation of the method of placing the filter 110 in the aperture. The center of gravity of the filter area 111 is assumed to be a first gravity center 901, the center of gravity of the filter area 112 is assumed to be a second gravity center 903, and the straight line joining those two points is referred to as a straight line L. The filter 110 is placed in such a way that the orientation of the straight line L is not coincident with the baseline direction (in FIG. 9, the X-axis direction). Moreover, the gravity center distance is assumed to be a positive number other than zero. In the example illustrated in FIG. 9, the straight line L is in a vertical relationship with the X axis, and the gravity center distance is approximately half of the radius of the filter area.

Figure 10:
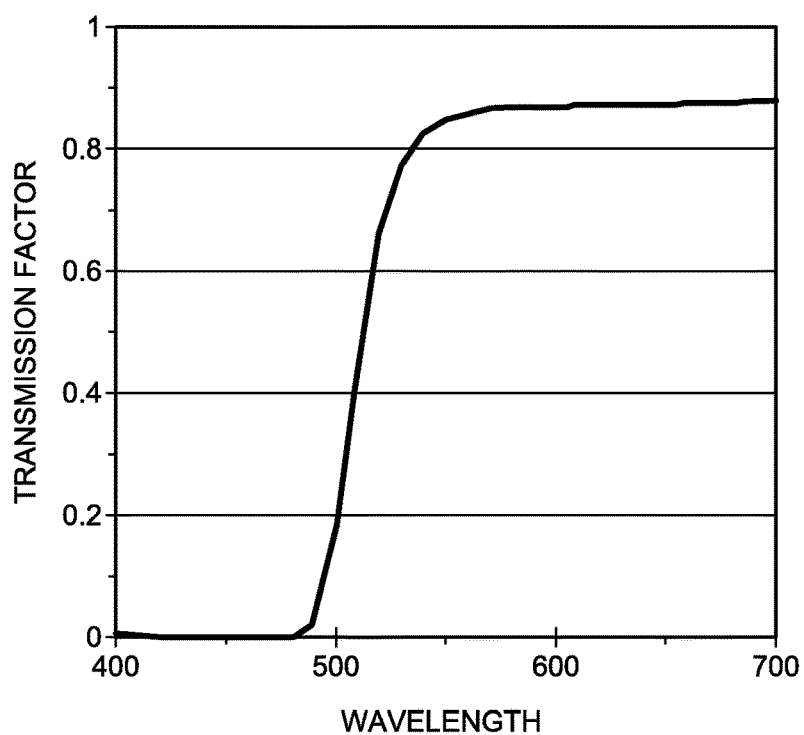
FIG. 10 is a diagram illustrating an example of transmission factor characteristics of a filter area according to the first embodiment.

FIG. 10 is a diagram illustrating an example of the transmission factor characteristics of the filter area 111 (Y filter) according to the first embodiment. As illustrated in FIG. 10, the filter area 111 (Y filter) transmits the light of red color and the light of green color, and attenuates the light of blue color. Meanwhile, the filter area 111 either can be a filter that varies the transmission factor of arbitrary wavelength bands, or can be a polarization filter (a polarization plate) that transmits the polarization light in an arbitrary direction, or can be a microlens that varies the light collection power of arbitrary wavelength bands. Examples of the filter that varies arbitrary wavelength bands include a fundamental color filter (RGB), a complementary filter (CMY), a color correction filter (CC-RGB/CMY), an infrared/ultraviolet cut filter, an ND filter, and a shield. When the filter area 111 is a microlens, the point spread function changes due to a bias caused by the lens 10a in the distribution of light beam collection.

Meanwhile, in the filter 110, as long as point symmetry is not achieved, an arbitrary number of filter areas can be present. Moreover, the filter 110 can be configured with only a single filter area that varies the point spread function of a plurality of sensor images.

It is desirable that the filter area 111 has the shape formed by dividing the filter 110 by an arbitrary straight line, and it is desirable that the straight line passes through the optical center. If the filter 110 has the shape formed by division using an arbitrary straight line, a defocusing correction filter (described later) can be reduced in dimensions. Moreover, if the straight line passes through the optical center, even if a diaphragm mechanism such as a screen for light intensity adjustment is inserted, it is possible to achieve a structure in which the point spread function of the sensor images can be varied.

The image sensor 20a receives the light that, of the light that has passed through the filter areas of the filter 110, does not undergo attenuation in any of the filter areas; and generates reference images. Thus, the sensor control unit 131 obtains the reference images generated by the image sensor 20a (Step S301). In the example illustrated in FIG. 9, the filter areas imply the filter areas 111 and 112. The point spread function of a reference image has only a small variation before and after passing through a filter area. In the case of the filter areas illustrated in FIG. 9, the image sensor 20a receives: the light of red color and the light of green color passing through the yellow filter (Y filter) representing the filter area 111; and the light that passes through the filter area 112 without any attenuation in the light of any color. Hence, the R image and the G image serve as reference images. The R image and the G image have a circular point spread function, and the defocusing shape thereof is also circular.

Meanwhile, the image sensor 20a receives the light that, of the light that has passed through the filter areas of the filter 110, has the point spread function changed while passing through the filter area 111; and generates a target image. Thus, the sensor control unit 131 obtains the target image generated by the image sensor 20a (Step S302). The point spread function of the target image changes in a point asymmetric manner due to the filter area 111. In the case of the filter areas illustrated in FIG. 9, the light of blue color, which gets attenuated while passing through the yellow filter (Y filter) representing the filter area 111, is received by the image sensor 20a. Hence, the B image serves as the target image. That is, of the light of blue color that passes through the filter areas of the filter 110, the light of blue color that passes through the filter area 111 gets absorbed, and the light of blue color that passes through the filter area 112 travels ahead without getting absorbed. For that reason, in the case of the filter 110 illustrated in FIG. 9, the point spread function of the target image is changed from having a circular shape to having a semicircular shape before and after passing through the filter areas, and the defocusing shape is semicircular.

Figure 11:
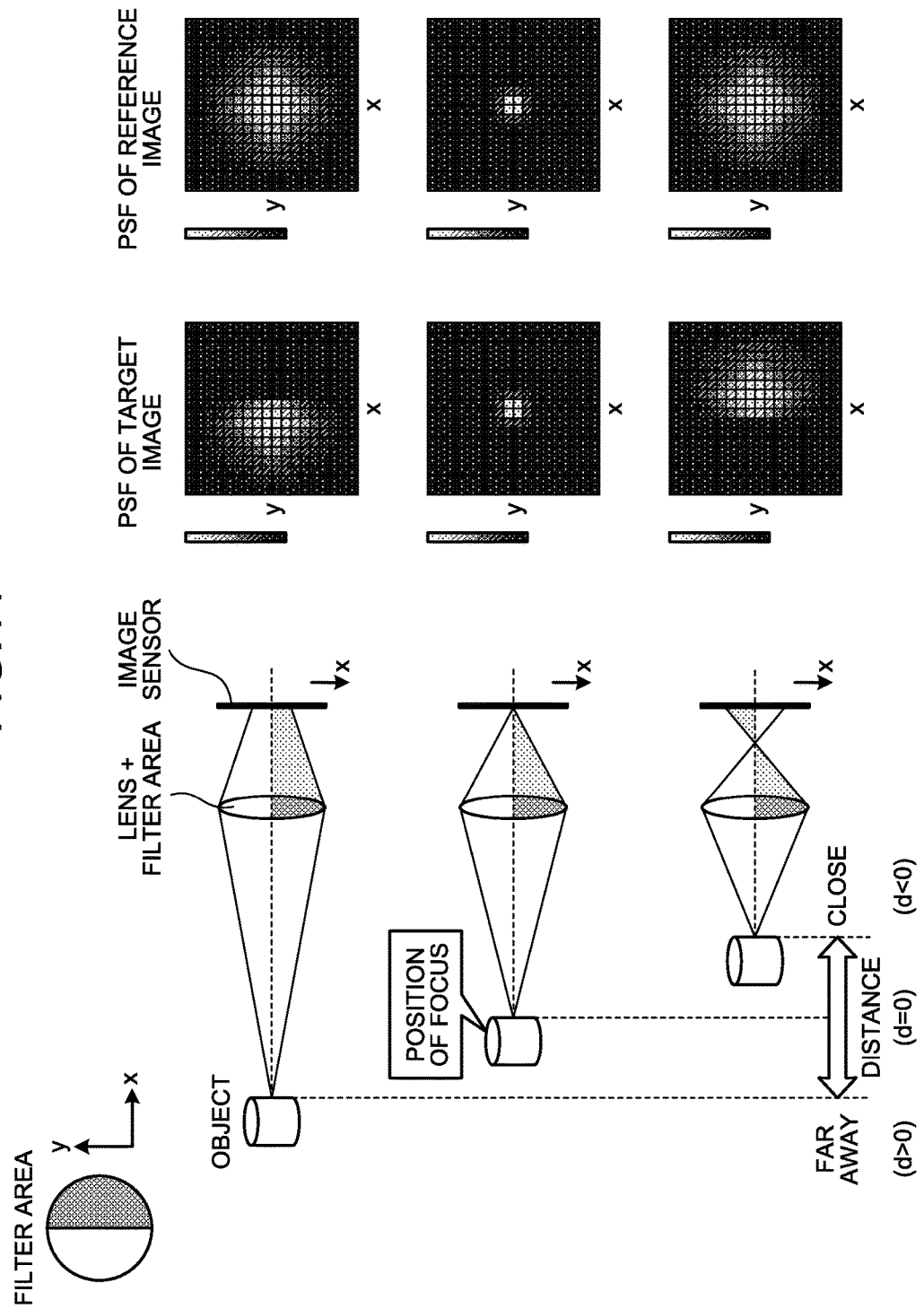
FIG. 11 is a diagram for explaining the relationship between the distance to the object and the shape of the point spread function according to the first embodiment.

FIG. 11 is a diagram for explaining the relationship between the distance to the object and the shape of the point spread function according to the first embodiment. As illustrated in FIG. 11, when the position of the object appearing in an image is farther away than the point of focus (i.e., when "d>0" holds true), defocusing biased to the left side is photographed in the target image as compared to the reference image. On the other hand, when the position of the object appearing in an image is closer than the point of focus (i.e., when "d<0" holds true), defocusing biased to the right side is photographed in the target image as compared to the reference image. When the position of the object appearing in an image is at the point of focus (i.e., when "d=0" holds true), the target image as well as the reference image is captured as an image without any defocusing. In the first embodiment, using such characteristics, the distance to the scene is calculated.

Meanwhile, based on the target image and the reference image obtained by the sensor control unit 131, the distance calculating unit 132 adds different defocusing in the target image and generates a corrected image by correcting the defocusing shape of the target image (Step S303). As described above, according to the distance d to the object captured in the image, the defocusing shape of the target image and the reference image changes. In the first embodiment, assuming that the distance to the object captured in the image is an arbitrary distance d, a corrected image is generated in which the defocusing shape in the target image is corrected using a plurality of defocusing correction kernels that are created. Then, such a distance d is obtained at which the correlation between the corrected image and the reference image becomes the highest, and the distance to the object is calculated. Regarding the method for calculating the correlation between the corrected image and the reference image, the explanation is given later.

Assuming that d represents the distance from the object appearing in a captured image Ix to the point of focus of the camera, the captured image Ix can be expressed according to (Equation 1) using an ideal captured image Iy having less blur (all-in-focus image) and using a point spread function f(d) of captured images.

$$Ix = f(d) * Iy \quad (1)$$

Figure 12:
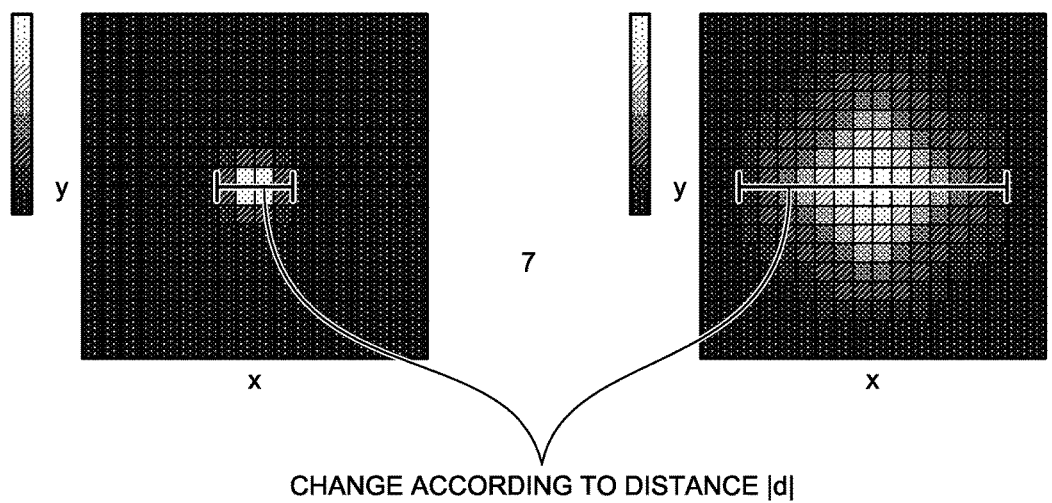
FIG. 12 is a diagram illustrating an example of the point spread function of a reference image according to the first embodiment.

The point spread function d(f) of captured images is decided according to the aperture shape of the photographing device 100 and the distance d. As described earlier, when the object is farther away than the point of focus, the distance d is expressed as "d>0"; and, when the object is closer than the point of focus, the distance d is expressed as "d<0". FIG. 12 is a diagram illustrating an example of the point spread function of a reference image according to the first embodiment. As illustrated in FIG. 12, in the case of the filter areas illustrated in FIG. 9, since the aperture shape is circular and has point symmetry, there is no change before and after the shape of the point spread function f(d); and the point spread function f(d) can be expressed as a Gauss function in which the width of defocusing changes according to the magnitude |d| of the distance d. Alternatively, the point spread function f(d) can be expressed as a pillbox function in which the width of defocusing changes according to the magnitude |d| of the distance d.

In an identical manner to (Equation 1), a reference image $Ix_r$ can be expressed according to (Equation 2) using a point spread function $f_r(d)$ decided from the characteristics of the aperture shape and the filter areas.

$$Ix_r = f_r(d) * Iy \quad (2)$$

In an identical manner to (Equation 1), a target image $Ix_o$ can be expressed according to (Equation 3) using a point spread function $f_o(d)$ decided from the characteristics of the aperture shape and the filter areas.

$$Ix_o = f_o(d) * Iy \quad (3)$$

Figure 13:
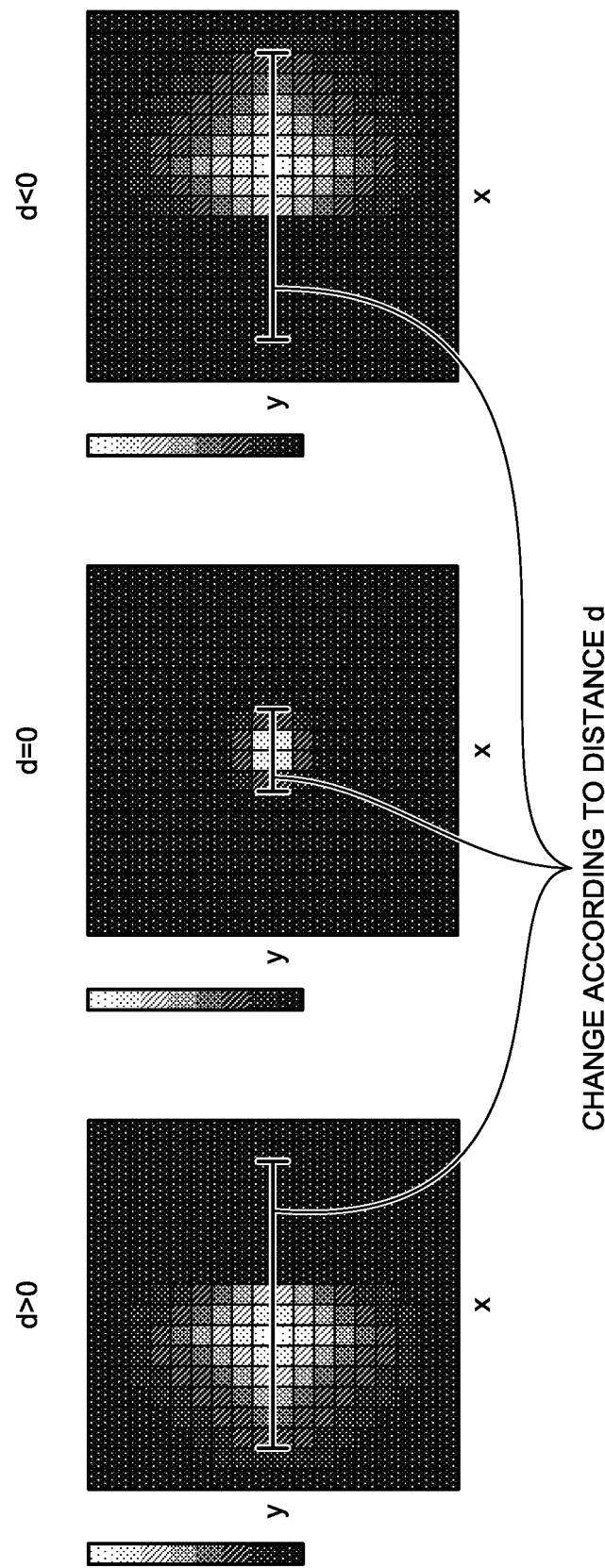
FIG. 13 is a diagram illustrating an example of the point spread function of a target image according to the first embodiment.

In the case of the filter areas illustrated in FIG. 9, since a reference image does not get affected by the filter area 111, $f_r(d) = f(d)$ is satisfied. However, regarding the point spread function $f_o(d)$, due to the effect of light attenuation in the filter area 111, the point spread function $f_o(d)$ changes to different shapes before and after the point of focus (d=0). FIG. 13 is a diagram illustrating an example of the point spread function of the target image according to the first embodiment. As illustrated in FIG. 13, when the object is farther away than the point of focus (i.e., when d>0 holds true), depending on the light attenuation in the filter area 111 with x>0 being satisfied, the point spread function $f_o(d)$ of the target image becomes a Gauss function of the width |d| of attenuated defocusing. When the object is closer than the point of focus (i.e., when d<0 holds true), depending on the light attenuation in the filter area 111 with x<0 being satisfied, the point spread function $f_o(d)$ of the target image becomes a Gauss function of the width |d| of attenuated defocusing.

Herein, the point spread function for applying defocusing to the target image $Ix_o$ and making the defocusing shape of the target image $Ix_o$ identical to the defocusing shape of the reference image is defined as a defocusing correction kernel $f_c(d)$. The defocusing correction kernel $f_c(d)$ can be expressed according to (Equation 4).

$$Ix_r = f_c(d) * Ix_o \quad (4)$$

The defocusing correction kernel $f_c(d)$ given in (Equation 4) can be expressed as (Equation 5) using the point spread function $f_r(d)$ of the reference image $Ix_r$ and the point spread function $f_o(d)$ of the target image $Ix_o$ according to the (Equation 2) to (Equation 4).

$$f_c(d) = f_r(d) * f_o^{-1}(d) \quad (5)$$

In (Equation 5), $f_o^{-1}(d)$ represents the inverse filter of the point spread function $f_o(d)$ of the target image. Thus, the defocusing correction kernel $f_c(d)$ can be calculated by analysis from the point spread functions of the reference image $Ix_r$ and the target image $Ix_o$. Moreover, using the defocusing correction kernel $f_c(d)$, the defocusing shape of the target image $Ix_o$ can be corrected to various defocusing shapes for arbitrary distances d.

Figure 14:
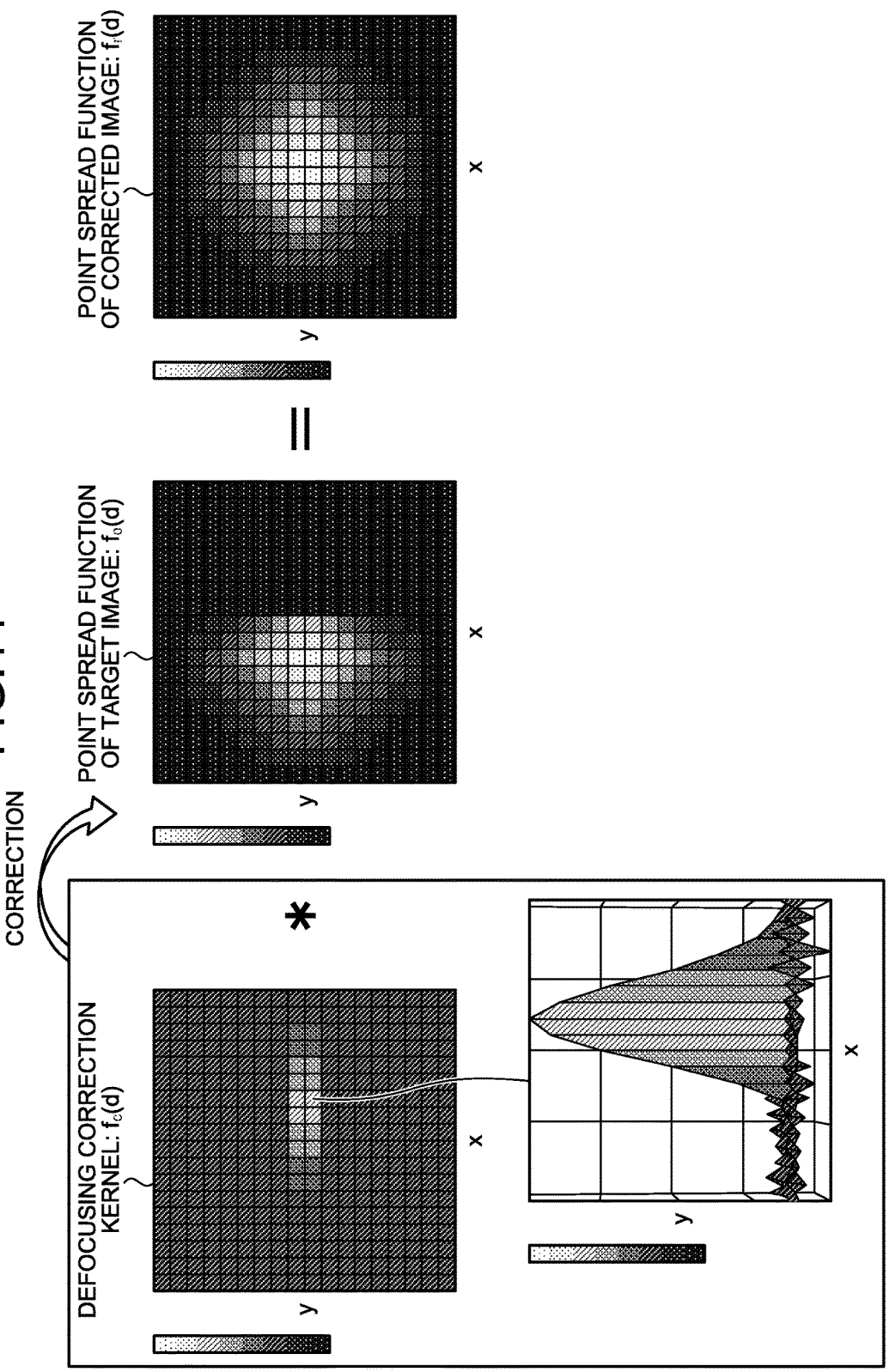
FIG. 14 is a diagram illustrating an example of a defocusing correction kernel according to the first embodiment.

FIG. 14 is a diagram illustrating an example of the defocusing correction kernel according to the first embodiment. The defocusing correction kernel illustrated in FIG. 14 is the defocusing correction kernel in the case of using the filter areas illustrated in FIG. 9. As illustrated in FIG. 14, when the shape is obtained by dividing the filter areas by an arbitrary straight line, the defocusing correction kernel $f_c(d)$ passes through the center point of the dividing line segment and is distributed on the straight line (in the vicinity of the straight line) in the vertical direction with respect to that line segment. Herein, if a corrected image $\hat{Ix}_o(d)$ represents the image obtained by correcting the defocusing shape of the target image $Ix_o$ using the defocusing correction kernel $f_c(d)$ at an arbitrary distance d, then the corrected image $\hat{Ix}_o(d)$ can be expressed according to (Equation 6). Meanwhile, "Ix^" represents Ix-hat in the equation.

$$\hat{Ix}_o = f_c(d) * Ix_o \quad (6)$$

Returning to the explanation with reference to FIG. 8, the distance calculating unit 132 compares the corrected image $\hat{Ix}_o(d)$ with the reference image Ix, and determines whether the defocusing shape of the corrected image $\hat{Ix}_o(d)$ coincides with the defocusing shape of the reference image $Ix_r$ (Step S304). If the defocusing shape of the corrected image $\hat{Ix}_o(d)$ coincides with the defocusing shape of the reference image $Ix_r$ (Yes at Step S304), then the distance calculating unit 132 ends the operations. However, if the defocusing shape of the corrected image $\hat{Ix}_o(d)$ does not coincide with the defocusing shape of the reference image $Ix_r$ (No at Step S304), then the distance calculating unit 132 again performs the operation at Step S303. That is, the distance calculating unit 132 obtains, at each pixel of the captured image, the distance d at which the defocusing shape of the corrected image $\hat{Ix}_o(d)$ is most coincident with the defocusing shape of the reference image $Ix_r$. Herein, coincidence need not only imply complete coincidence of the defocusing shapes, but can also imply a case in which the degree of coincidence is smaller than a predetermined threshold value (described later). As far as the degree of coincidence of the defocusing shapes, the correlation between the corrected image $\hat{Ix}_o(d)$ and the reference image $Ix_r$ can be calculated in a rectangular area of an arbitrary size centered around each pixel. The calculation of the degree of coincidence of the defocusing shapes can be performed using an existing similarity ratio evaluation method. With that, the distance calculating unit 132 obtains such a distance d at which the correlation between the corrected image $\hat{Ix}_o(d)$ and the reference image $Ix_r$ is the highest, and calculates the distance to the object appearing in each pixel.

Examples of the existing similarity ratio evaluation method include the sum of squared difference (SSD) method, the sum of absolute difference (SAD) method, the normalized cross-correlation (NCC) method, the zero-mean normalized cross-correlation (ZNCC) method, and the color alignment measure. In the first embodiment, the color alignment measure is implemented that makes use of the characteristic that the color components of a natural image locally have a linear relationship.

In the color alignment measure, from the color distribution in a local boundary centered around the target pixel of the captured image, an index L indicating the correlation is calculated. In the RGB image generated from the reference image $Ix_r$, which is captured by the image sensor 20a, and from the corrected image $\hat{Ix}_o(d)$, which is assumed to have the distance d; an index L(d) is calculated for the local area centered around each pixel. In the case of the filter areas illustrated in FIG. 9, in a color image generated from a corrected image $\hat{B}(d)$ that is formed by correcting the R image, the G image, and the B image, which are captured by the image sensor 20a, using the defocusing correction kernel for the distance d; the index L(d) at each pixel is calculated according to (Equation 7). Herein, "B^" represents B-hat in the equation.

$$L(d)=\lambda_0\lambda_1\lambda_2/\sigma_R^2\sigma_G^2\sigma_{\hat{B}(d)}^2 \quad (7)$$

In (Equation 7), $\lambda_0$, $\lambda_1$, and $\lambda_2$ represent the dispersion along the main component axis of the color distribution of the image (i.e., represent eigenvalues of the covariance matrix of the image). Moreover, in (Equation 7), $\sigma_R^2$, $\sigma_G^2$, and $G_B^2$ represent the dispersion along the R axis, the G axis, and the B axis, respectively, of the color distribution of the image. Thus, it indicates that, smaller the index L(d), higher is the degree of coincidence of the color images. Hence, at Step S304, the distance calculating unit 132 determines whether or not the index L(d) is smaller than a threshold value and, if the index L(d) is smaller than the threshold value, ends the distance estimation at the target pixel. However, if the index L(d) is equal to or greater than the threshold value, then the system control returns to Step S303 and the distance calculating unit 132 generates a correction image for a different distance d. Meanwhile, instead of performing such conditional determination using a threshold value, the calculation of the distance to the object appearing in each pixel can be performed by calculating the index L(d) for all assumed distances d and obtaining the distance d having the smallest index L(d). Moreover, as a result of obtaining the distance to each object, the distance image can be generated as an image in which the object present more on the near side appears brighter and the object present more on the far side appears darker.

As described above, the defocusing shape of the target image, which has been changed according to the filter areas installed in the optical system of the photographing device 100, is corrected using the defocusing correction kernel for the assumed distance d, and a correction image is generated. Then, the distance d at which the correlation of the corrected image and the reference image becomes the highest is obtained; and the distance to the object captured in the image is calculated. According to the first embodiment, since the distance is calculated using the correlation of images having the coinciding point spread function and the coinciding sampling position, distance estimation of a high degree of accuracy can be performed. Moreover, according to the first embodiment, since the defocusing information representing the convolution result of space information is used, the result of distance estimation becomes stable. Thus, without causing repetitive patterns and the shade formation issue, distance estimation of a high degree of accuracy can be performed.

Moreover, in a distance image obtained by stereography, to the points which are present on the epipolar plane and at which the distance information cannot be obtained, the distance information obtained using a color filter can be assigned. In a distance image obtained using a color filter, to the points which are present on the epipolar plane and at which the distance information cannot be obtained, the distance information obtained using stereoscopy can be assigned. The photographing device 100 according to the first embodiment can obtain the distance information on the epipolar plane too.

Moreover, according to the first embodiment, the distance calculating unit 133 can obtain the correspondence to the features on the epipolar plane. Thus, the distance information of the features that could not be obtained in the past can be obtained with a high degree of accuracy.

First Modification Example

The image sensor 20b too can include a filter that transmits light of particular wavelength bands. The filter can have two filter areas which transmit mutually different wavelength bands. The filter areas can be same as the filter areas 111 and 112, or can be different filter areas.

Using the sensor image obtained by the image sensor 20b, DFD-based distance calculation can also be performed. For example, not only with respect to the sensor image obtained from the image sensor 20a (the first sensor image) but also with respect to the sensor image obtained from the image sensor 20b (the second sensor image), the distance calculating unit 132 can calculate the distance to the object according to a method identical to the method explained earlier. As a result, the distance information can be obtained with a higher degree of accuracy.

Second Modification Example

In the first embodiment described above, the sensor image (for example, a B image) in which the defocusing shape changes according to the filter is treated as the target image, and the sensor images (for example, an R image and a G image) in which the defocusing shape does not change are treated as the reference images. Alternatively, an image formed by correcting any of those sensor images to have an arbitrary shape can be used as the reference image. That is, the images formed by correcting the sensor images, other than the sensor image serving as the target image from among a plurality of sensor images, can be treated as the reference images.

Third Modification Example

The filter 110 can have more filter areas in addition to having the filter areas 111 and 112. FIGS. 15 to 20 are diagrams illustrating exemplary configurations of the filter 110 that further includes a filter area 113 (a third filter area). With respect to the filter 110 illustrated in FIGS. 15 to 20 too, the method identical to the embodiment described above can be implemented.

Figure 15:
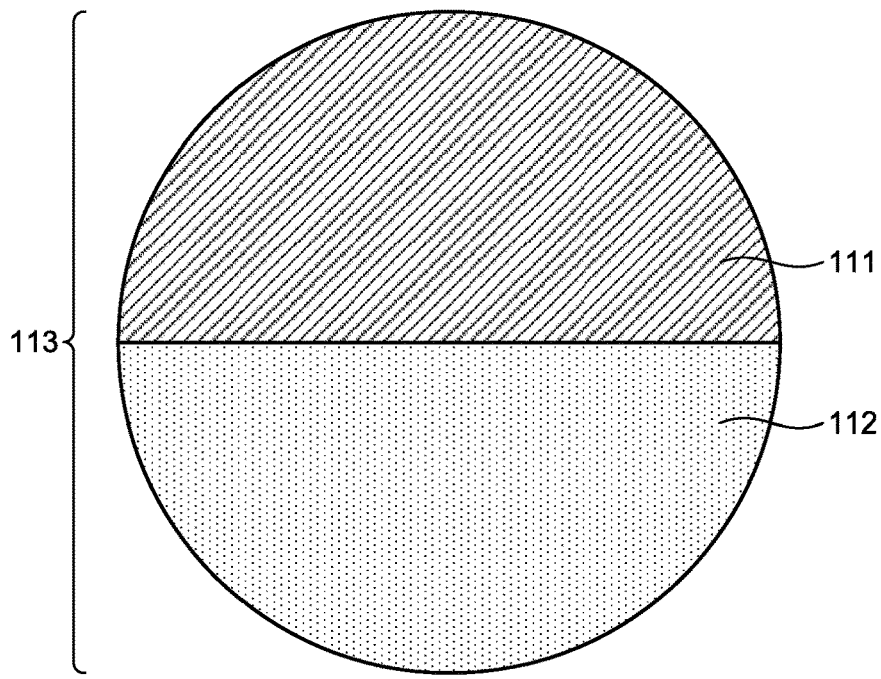
FIG. 15 is a diagram illustrating exemplary configurations of a filter including a third filter area.

The filter area 113 transmits a different wavelength band than the wavelength bands transmitted by the filter areas 111 and 112, and need not have a point asymmetric shape. As illustrated in FIG. 15, the filter area 113 can be added over the entire area of the filter 110. As a result, all of the light passing through the aperture of the lens 10a can be made to fall on the image sensor 20a.

Figure 16:
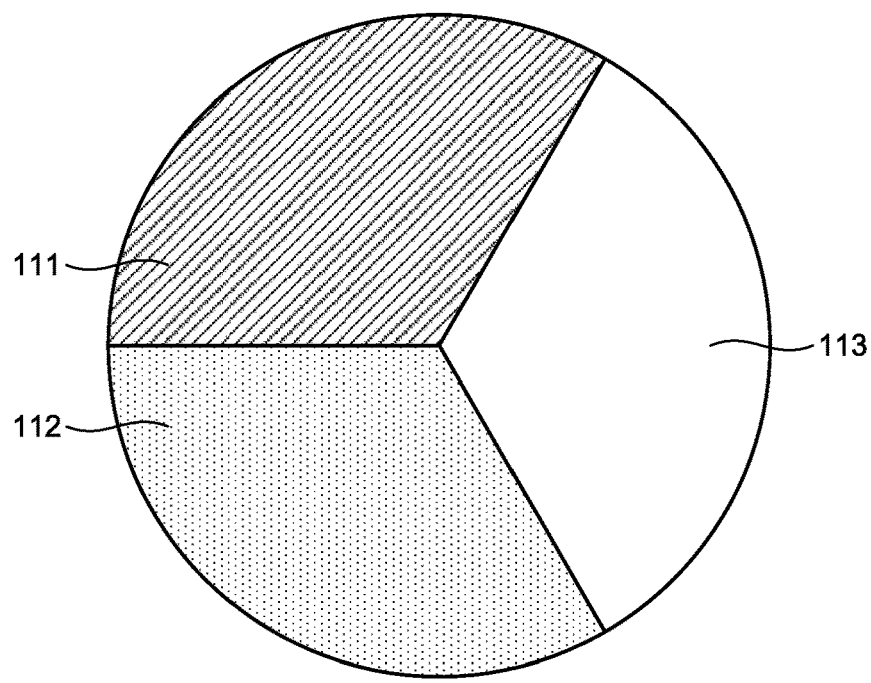
FIG. 16 is a diagram illustrating exemplary configurations of a filter including a third filter area.
Figure 17:
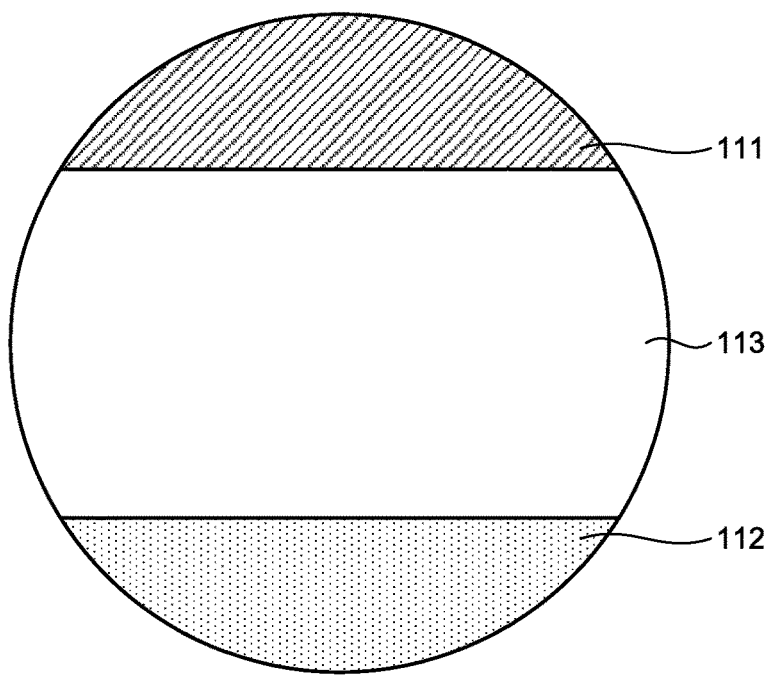
FIG. 17 is a diagram illustrating exemplary configurations of a filter including a third filter area.
Figure 18:
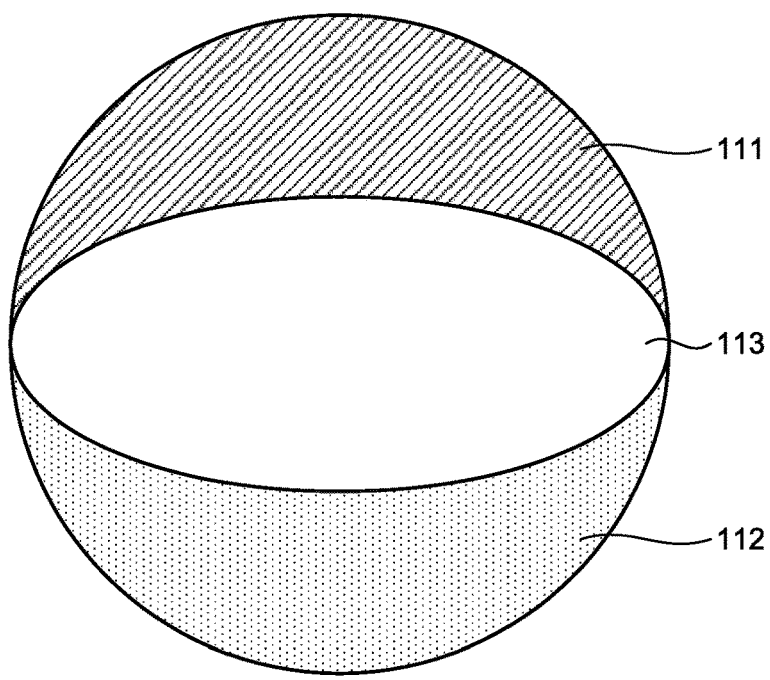
FIG. 18 is a diagram illustrating exemplary configurations of a filter including a third filter area.
Figure 19:
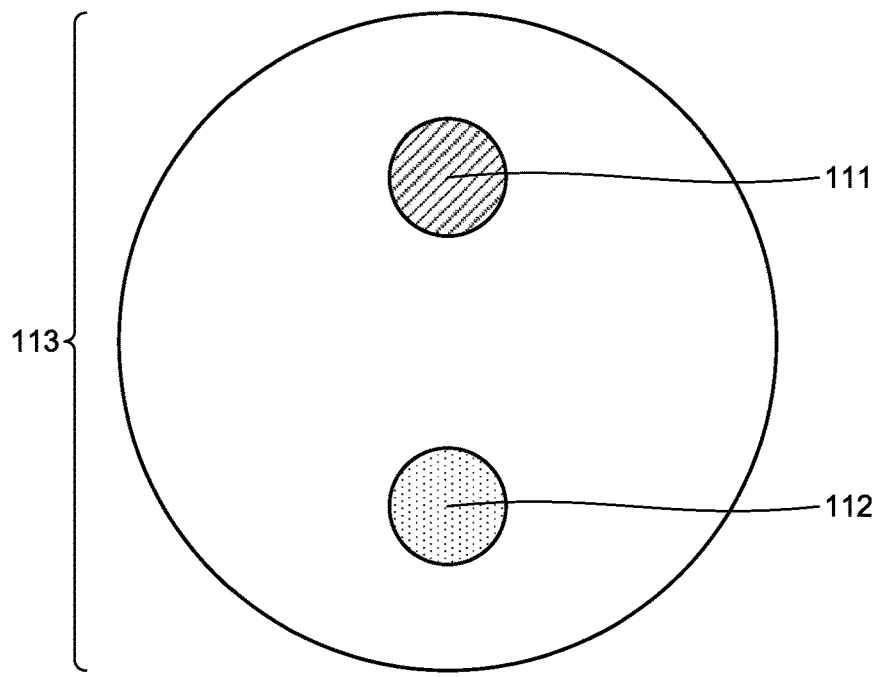
FIG. 19 is a diagram illustrating exemplary configurations of a filter including a third filter area.
Figure 20:
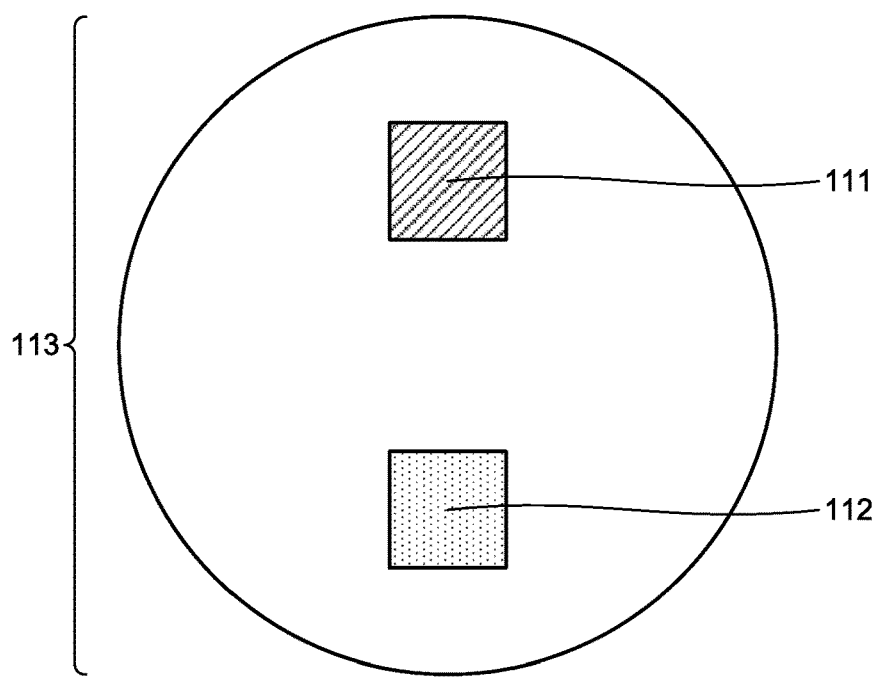
FIG. 20 is a diagram illustrating exemplary configurations of a filter including a third filter area.

As illustrated in FIG. 16, the filter 110 can be divided equally among three filter areas. As illustrated in FIG. 17, the filter area 111 can be formed at the upper end, the filter area 112 can be formed at the lower end, and the filter area 113 can be formed in the remaining portion. Alternatively, the filter areas in the upper and lower ends can have the shapes as illustrated in FIG. 18. As illustrated in FIG. 19, the filter areas 111 and 112 can be formed as circular areas at different positions, and the remaining area can be set as the filter area 113. Alternatively, as illustrated in FIG. 20, the filter areas 111 and 112 can be formed to have square shapes. Meanwhile, the filter area 113 can be a filter for transmitting all wavelength bands that are received by the image sensor 20a.

As illustrated in FIG. 15, when the filter area 113 is formed in an overlapping manner on the filter areas 111 and 112; for example, the filter areas 111, 112, and 113 can be set as filters for transmitting the light of red color, the light of blue color, and the light of green color, respectively. In that case, the overlapping area of the filter areas 111 and 113 is equivalent to the Y filter. Thus, for example, the transmission factor characteristics of the combination of the filter areas 111 and 113 are identical to those illustrated in FIG. 10.

Second Embodiment

In the first embodiment in which a point asymmetric filter is used, using the fact that the defocusing shape differs before and after the point of focus, the distance corresponding to the defocusing shape can be uniquely fixed. In a second embodiment, such a filter is used which, when the optical center serves as the point of symmetry, is point symmetric in shape. In that case, the defocusing shape before the point of focus becomes same as the defocusing shape after the point of focus, and there are times when the distance cannot be fixed in a unique manner. In that regard, in the second embodiment, the point of focus is either set to infinity or set to the nearest point. As a result, the shape change can be confined to only either the shape change of the foreground defocusing or the shape change of the background defocusing. Hence, even in the configuration having a point symmetric filter, the correspondence between the amount of defocusing and the distance can be fixed in a unique manner.

Figure 21:
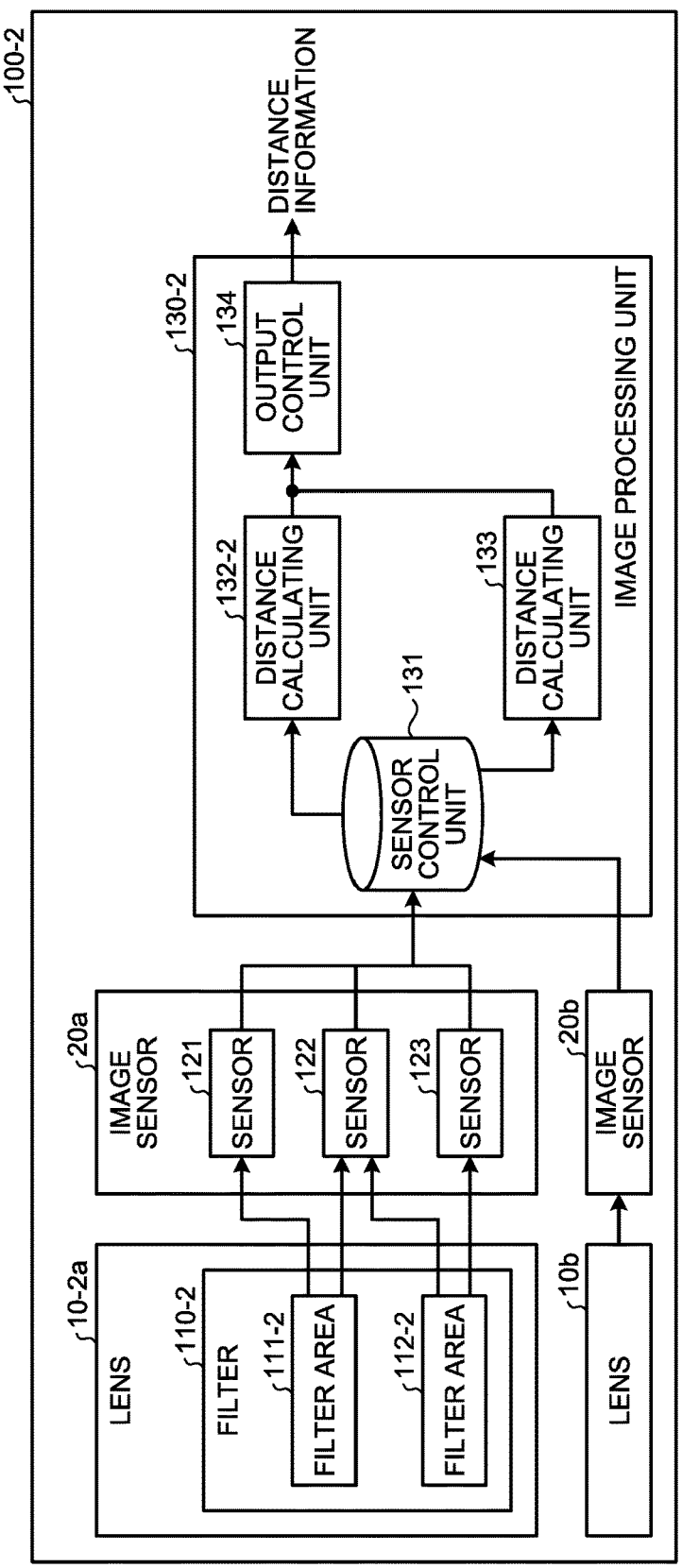
FIG. 21 is a functional block diagram of a photographing device according to a second embodiment.

A photographing device according to the second embodiment has an identical hardware configuration to the hardware configuration illustrated in FIG. 1. Hence, that explanation is not repeated. FIG. 21 is a block diagram illustrating an exemplary functional configuration of a photographing device 100-2 according to the second embodiment. As illustrated in FIG. 21, the photographing device 100-2 includes lenses 10-2a and 10b, the image sensors 20a and 20b, and an image processing unit 130-2.

In the second embodiment, the lens 10-2a and the image processing unit 130-2 have a different configuration as compared to the first embodiment. The remaining configuration and functions are identical to FIG. 5 that is a block diagram of the photographing device 100 according to the first embodiment. Hence, the same reference numerals are used, and the explanation is not repeated.

The lens 10-2a includes a filter 110-2, which has filter areas 111-2 and 112-2 for transmitting light of mutually different wavelength bands.

Figure 22:
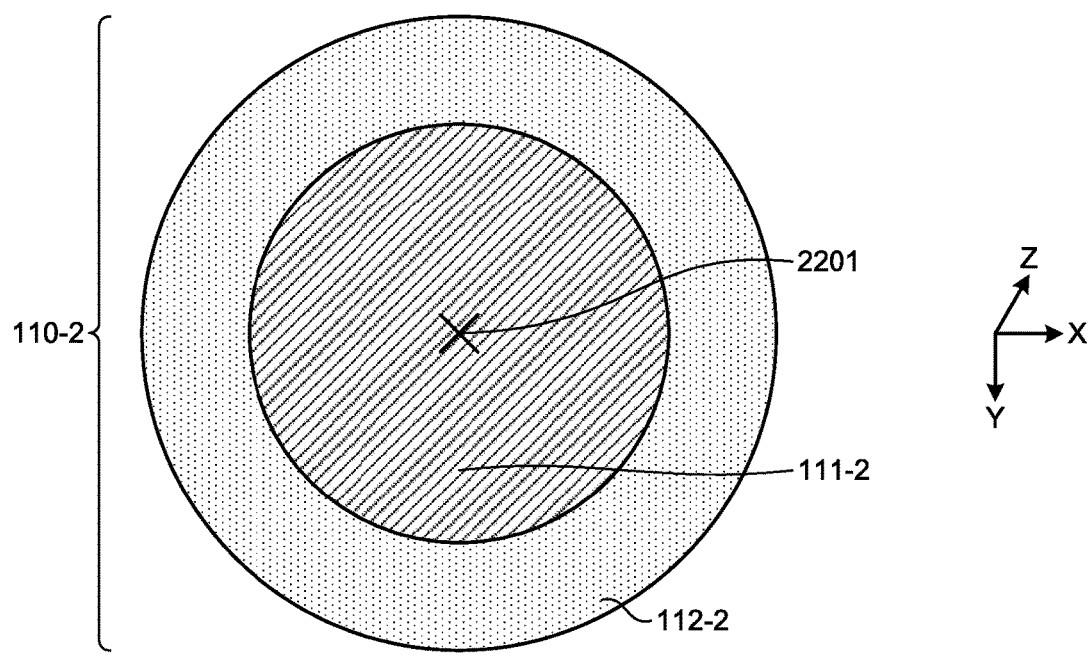
FIG. 22 is a diagram illustrating an exemplary configuration of filter areas according to the second embodiment.

FIG. 22 is a diagram illustrating an exemplary configuration of the filter areas according to the second embodiment. As illustrated in FIG. 22, the filter area 111-2 is formed to have point symmetry when a center point 2201 of the filter area 111-2 (the point at the position of the center of gravity) representing the optical center serves as the point of symmetry.

For example, in the filter 110-2, the yellow filter (Y filter) can be set as the filter area 111-2, and the filter area other than the filter area 111-2 can be set as the filter area 112-2. That is, when the optical center serves as the point of symmetry, the filter area 111-2 representing the yellow filter (Y filter) becomes point symmetric. The filter area 112-2 too becomes point symmetric when the optical center serves as the point of symmetry. Since being on the inside of the filter 110-2, the filter area 111-2 need not be circular if it is point symmetric. Alternatively, for example, the filter area 111-2 can be quadrilateral or hexagonal in shape.

In the image processing unit 130-2, a distance calculating unit 132-2 has different functions than the functions in the image processing unit 130 according to the first embodiment.

The distance calculating unit 132-2 receives input of the first sensor image, calculates the distance to the object captured in the image, and outputs distance information (a first distance image) indicating the distance. For example, in an identical manner to the first embodiment, the distance calculating unit 132-2 sets, as the reference images, the sensor images (for example, the R image and the G image) corresponding to the light that has passed without attenuation through the filter 110-2. Moreover, for example, the distance calculating unit 132-2 sets, as the target image, the sensor image (for example, the B image) corresponding to the light that gets attenuated while passing through the filter area 111-2. Then, the distance calculating unit 132-2 calculates the distance to the object by obtaining, from among a plurality of defocusing correction kernels, the defocusing correction kernel for which the correlation between a corrected image, which represents the target having with defocusing added thereto, and the reference images becomes the highest; and outputs the first distance image.

In the second embodiment, since the point of focus is either set to infinity or set to the nearest point, the defocusing shape corresponds to the distance in a unique manner. For that reason, the defocusing correction kernel corresponding to the distance d is also decided in a unique manner. The distance calculating unit 132-2 can calculate the distance d by obtaining the defocusing correction kernel having the highest correlation between the corrected image and the reference images.

Third Embodiment

As described in the first embodiment, in stereo ranging, two cameras (the image sensors 20a and 20b) are in a parallel coordinative relationship. Hence, the search range for matching can be reduced from two dimensions to one dimension. In other words, using the epipolar geometry, the epipolar line of the left-side camera and the epipolar line of the right-side camera are defined in the horizontal direction.

Figure 23:
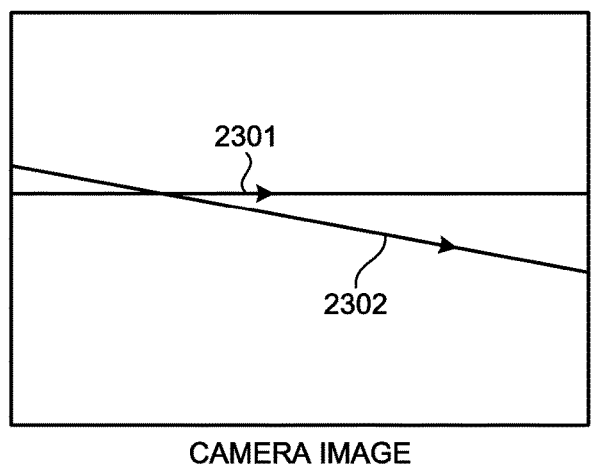
FIG. 23 is a diagram illustrating a state in which there is a change in the direction of epipolar lines.

However, due to deterioration over time, the positional relationship of the right-side camera and the left-side camera is disrupted, and the epipolar lines become inclined with respect to the image face. Thus, sometimes the corresponding points are not found or the correspondence becomes erroneous. FIG. 23 is a diagram illustrating a state in which there is a change in the direction of epipolar lines. A search direction 2301 during a parallel coordinative relationship represents the horizontal direction. When the positions and the orientations of the right and left cameras undergo a change due to deterioration over time, the epipolar lines become inclined and a search direction 2302 becomes non-horizontal.

As one of the solutions to this issue, there is a method of re-estimating the epipolar geometry of two images. For example, a calibration pattern of known shapes is provided, and the epipolar geometry is estimated from the correspondence relationship of a plurality of points in the right and left cameras. Then, image conversion is so performed that the images are horizontal with respect to the obtained epipolar lines, and a distance image is generated from the right and left camera images in a parallel coordinative relationship. In this method, a calibration pattern needs to be provided manually, thereby resulting in a load to the user. Moreover, if the features of the object are used without using a calibration pattern, then the scale of the obtained distance image becomes indeterminate.

In the third embodiment, the epipolar geometry is estimated from the correspondence relationship between the first distance image and the second distance image. As a result, without causing any load to the user, any misalignment in the positions and the orientations of the image sensors 20a and 20b can be corrected with ease.

Figure 24:
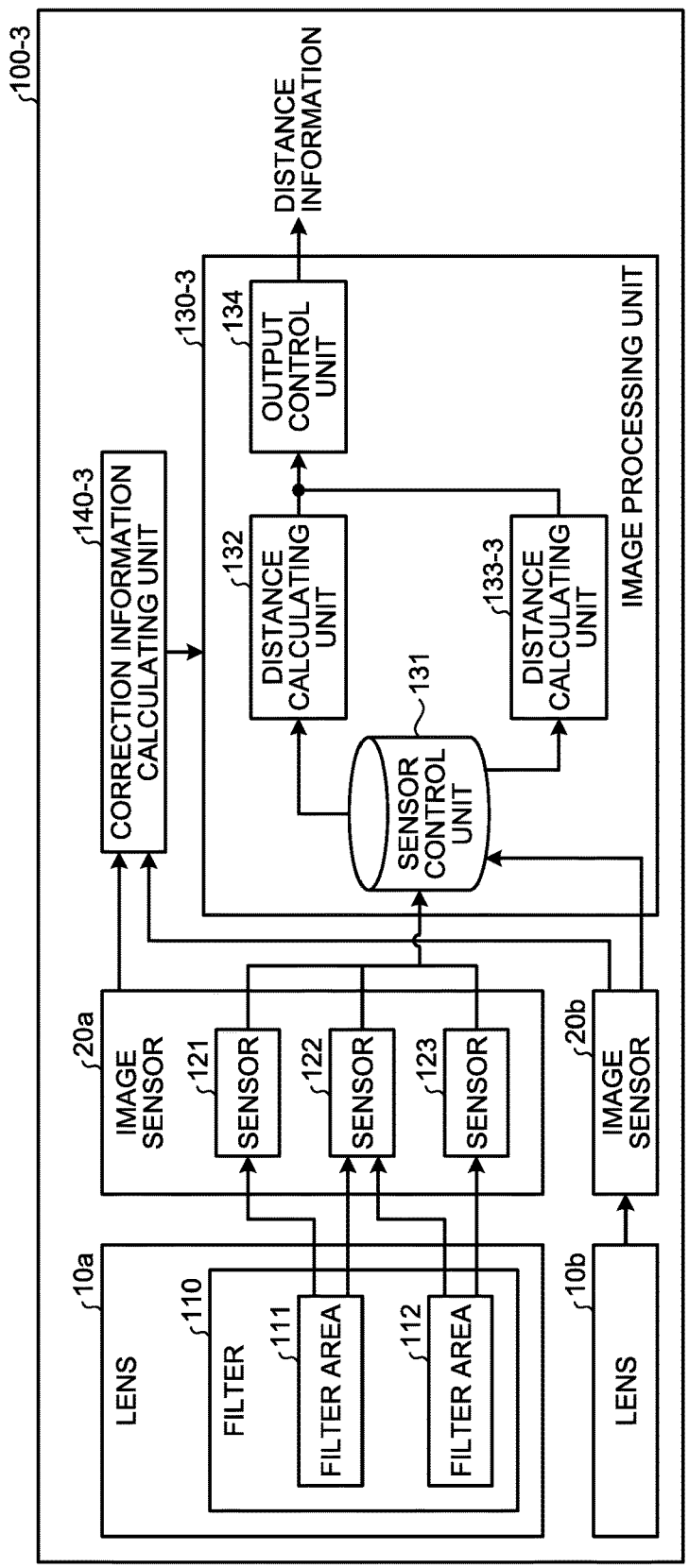
FIG. 24 is a functional block diagram of a photographing device according to a third embodiment.

A photographing device according to the third embodiment has an identical hardware configuration to the hardware configuration illustrated in FIG. 1. Hence, that explanation is not repeated. FIG. 24 is a block diagram illustrating an exemplary functional configuration of a photographing device 100-3 according to the third embodiment. As illustrated in FIG. 24, the photographing device 100-3 includes the lenses 10a and 10b, the image sensors 20a and 20b, an image processing unit 130-3, and a correction information calculating unit 140-3.

In the third embodiment, a distance calculating unit 133-3 of the image processing unit 130-3 has different functions as compared to the first embodiment. Moreover, the addition of the correction information calculating unit 140-3 is also a difference as compared to the first embodiment. The remaining configuration and functions are identical to FIG. 5 that is a block diagram of the photographing device 100 according to the first embodiment. Hence, the same reference numerals are used, and the explanation is not repeated.

In response to a user instruction, the correction information calculating unit 140-3 calculates correction information from the first sensor image and the second sensor image. Herein, the correction information represents information for correcting the target image for correction, which is at least one of the first sensor image and the second sensor image, in such a way that the positional relationship between the first sensor image and the second sensor image satisfies a particular relationship. For example, the correction information contains a projection transformation matrix, which is used for performing transformation so that the right and left camera images (the first sensor image and the second sensor image) become parallel coordinative images, and contains the baseline length.

The inter-camera relationship for achieving a parallel coordinative relationship can be satisfied by fixing the position and the orientation of one camera and then transforming the position and the orientation of the other camera. For that reason, it is sufficient to obtain the parameters of a projection transformation matrix for transforming one image among the right and left images. However, the parameters of a plurality of projection transformation matrices for transforming both images can also be included as the correction information. In the third embodiment, the explanation is given for an example in which the projection transformation matrix for transforming the second sensor image is used along with the baseline length as the correction information.

For example, when information indicating a user instruction to start correction of position-orientation misalignment (for example, a code indicating the start) is input, the correction information calculating unit 140-3 starts a correction information calculation operation. The details of the correction information calculation operation are given later.

As compared to the distance calculating unit 133 according to the embodiments described above, the distance calculating unit 133-3 differs in the way of correcting the second sensor image using the correction information and then generating a second distance image according to stereo ranging.

Figure 25:
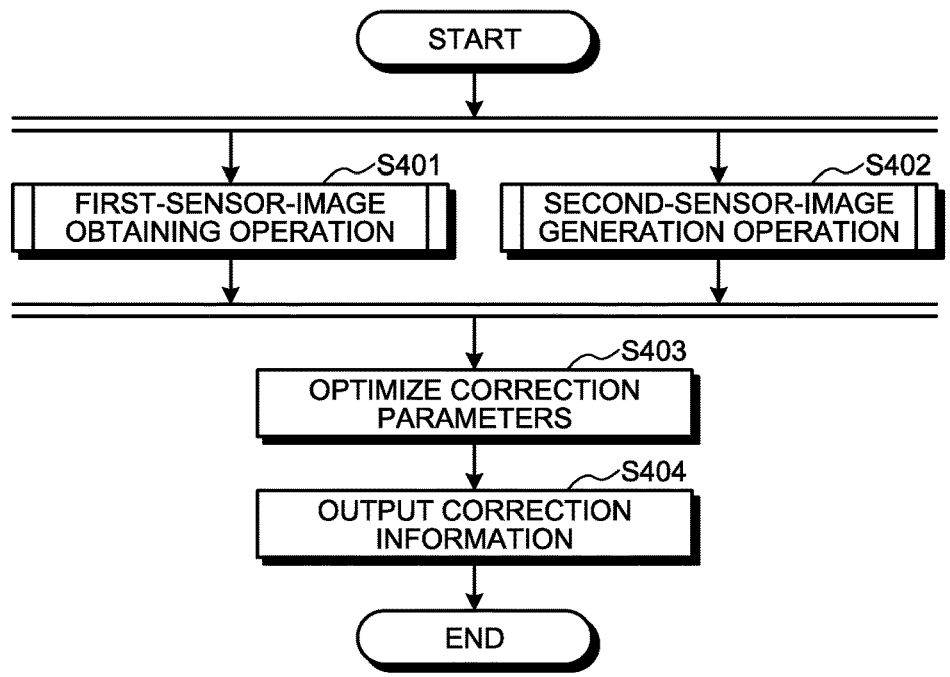
FIG. 25 is a flowchart for explaining a correction information calculation operation performed according to the third embodiment.

Explained below with reference to FIG. 25 is the correction information calculation operation performed by the photographing device 100-3 configured in the abovementioned manner according to the third embodiment. FIG. 25 is a flowchart for explaining an example of the correction information calculation operation performed according to the third embodiment.

The operations performed at Steps S401 and S402 are identical to the operations performed at Steps S101 and S102 illustrated in FIG. 6. Hence, that explanation is not repeated.

The correction information calculating unit 140-3 performs a correction parameter optimization operation for calculating correction information (Step S403). Firstly, the correction information calculating unit 140-3 measures the position-orientation misalignment of the right and left cameras, and generates virtually parallel coordinative images. For example, the correction information calculating unit 140-3 estimates the epipolar geometry from the right and left camera images, and obtains parallel coordinative images of the right and left camera images according to the method of generating virtually parallel coordinative images (for example, refer to Patent Literature 1). The two images that are obtained according to that method cannot be used in correctly calculating the distance because the baseline lengths of the cameras are not known.

In that regard, the correction information calculating unit 140-3 estimates a baseline length B' using the second distance image obtained according to the DFD method that is different than stereo ranging. For example, with respect to each of a plurality of baseline lengths, the correction information calculating unit 140-3 calculates the first distance image according to stereo ranging. Then, the correction information calculating unit 140-3 compares each calculated first distance image with the second distance image on a pixel-by-pixel basis, and obtains the baseline length B' corresponding to such a first distance image which has the smallest error.

As a result of such operations, the baseline length B' is obtained along with a projection transformation matrix for achieving a parallel coordinative relationship.

Then, the correction information calculating unit 140-3 outputs the baseline length B' and the projection transformation matrix as the correction information to the image processing unit 130-3 (Step S404).

Figure 26:
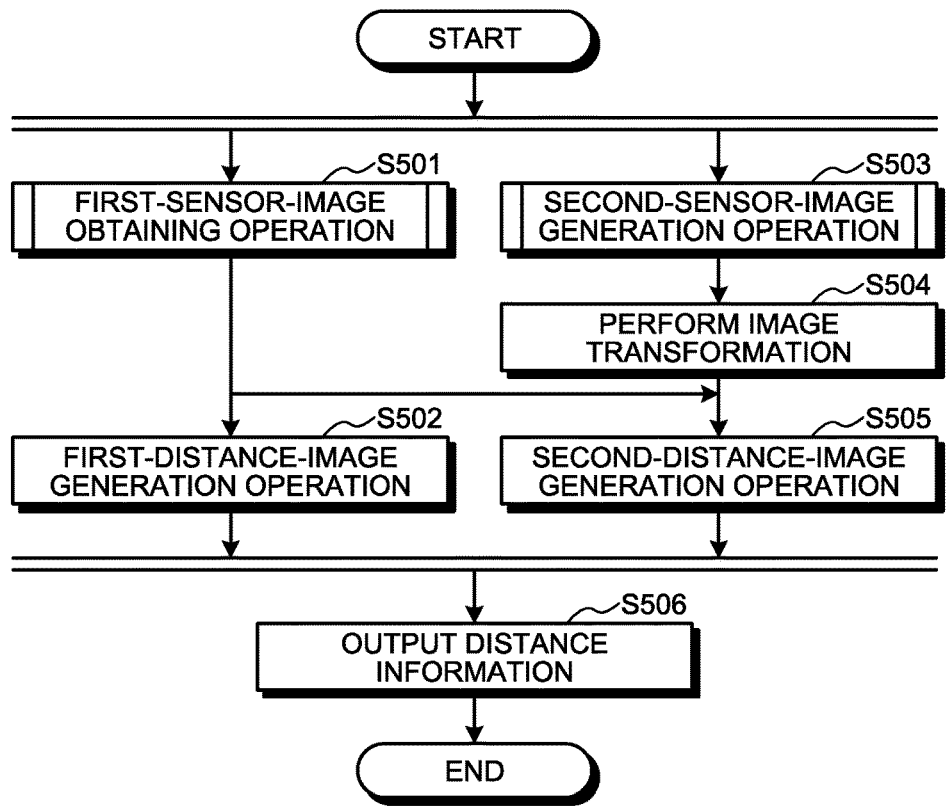
FIG. 26 is a flowchart for explaining the image processing performed according to the third embodiment.

Explained below with reference to FIG. 26 is the image processing performed by the photographing device 100-3 according to the third embodiment. FIG. 26 is a flowchart for explaining an example of the image processing performed according to the third embodiment.

The operations performed at Steps S501 to S503 are identical to the operations performed at Steps S101 to S103 illustrated in FIG. 6. Hence, that explanation is not repeated.

The distance calculating unit 133-3 transforms the second sensor image using the projection transformation matrix obtained by the correction information calculating unit 140-3 (Step S504). Moreover, the distance calculating unit 133-3 performs stereoscopy using the baseline length obtained by the correction information calculating unit 140-3, and generates a second distance image (Step S505).

The operation performed at Step S506 is identical to the operation performed at Step S105 illustrated in FIG. 6. Hence, that explanation is not repeated.

Meanwhile, till now, the explanation is given about the configuration in which the correction information calculating unit 140-3 is added to the first embodiment. However, the configuration in which the correction information calculating unit 140-3 can be added is not limited to the first embodiment. That is, the correction information calculating unit 140-3 can be added also to the modification examples and the second embodiment. Thus, the third embodiment can be applied to any arbitrary filter.

According to the third embodiment, in addition to achieving the effect of the first embodiment, the position-orientation misalignment between the image sensors 20a and 20b can be corrected using the correction information calculating unit 140-3. That enables achieving reduction in the time and efforts required for calibration.

As described above, according to the first to third embodiments, the distance information can be obtained with a higher degree of accuracy.

Figure 27:
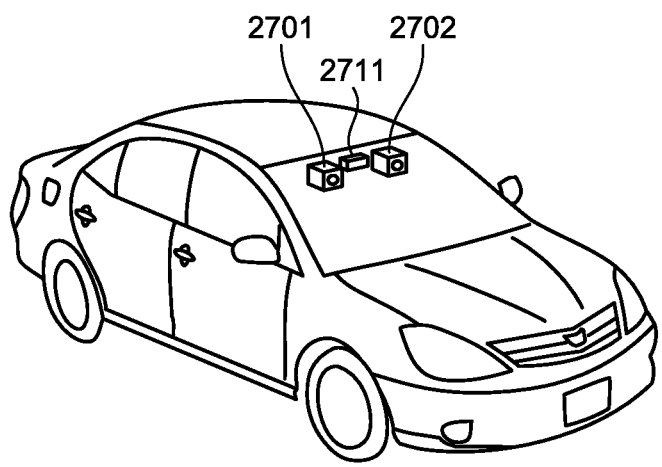
FIG. 27 is a diagram illustrating an example in which the photographing device is installed in an automobile.

The photographing device described above can be installed in a vehicle (an example of a mobile object) such as an automobile. FIG. 27 is a diagram illustrating an example in which the photographing device is installed in an automobile. The automobile includes a left-side camera 2701, a right-side camera 2702, and a control unit 2711. The camera 2701 corresponds to, for example, the lens 10a and the image sensor 20a illustrated in FIG. 1. The camera 2702 corresponds to, for example, the lens 10b and the image sensor 20b illustrated in FIG. 1. The control unit 2711 controls the movement of the automobile based on the distance information (first-type distance information and second-type distance information). Apart from that, for example, the control unit 2711 can have the same functions as those of the image processing unit 130 illustrated in FIG. 5.

The mobile object is not limited to a vehicle, and alternatively can be a robot, a ship, or a flying object (such as an airplane or a drone). Moreover, the mobile object either can be an autonomous mobile object or can be a manned mobile object.

The computer program executed in the photographing device according to the first to third embodiments is recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Alternatively, the computer program executed in the photographing device according to the first to third embodiments can be stored in a downloadable manner in a computer connected to a network such as the Internet. Still alternatively, the computer program executed in the photographing device according to the first to third embodiments can be distributed over a network such as the Internet.

Still alternatively, the computer program executed in the photographing device according to the first to third embodiments can be stored in advance in a ROM.

The computer program executed in the photographing device according to the first to third embodiments contains modules of the constituent elements described above. As the actual hardware, the CPU 30 (processor) reads the computer program from a memory medium and executes it. As a result, the constituent elements are loaded and generated in a main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A photographing device comprising:
   a first image sensor that includes
   a first sensor that receives light of a first wavelength band and outputs a target image, and
   a second sensor that receives light of a second wavelength band and outputs a reference image;
   a first filter area that transmits a first light of a third wavelength band, which includes at least a part of the first wavelength band, the first light being a part of light incident on the first image sensor;
   a second image sensor that outputs a first image;
   a first distance calculating unit that, based on the target image and the reference image, calculates a first distance to an object captured in the target image and the reference image;
   a second distance calculating unit that, based on the reference image and the first image, calculates a second distance to an object captured in the reference image and the first image; and
   an output control unit that, based on the first distance and the second distance, determines and outputs a corrected distance.

2. The photographing device according to claim 1, wherein
   the first distance calculating unit calculates the first distance according to a correlation between the target image and the reference image, and
   the second distance calculating unit calculates the second distance based on the reference image, based on the first image, and based on a third distance representing a distance between the first image sensor and the second image sensor.

3. The photographing device according to claim 2, wherein the first distance calculating unit calculates the first distance based on the target image, which has a point asymmetric point spread function, and the reference image.

4. The photographing device according to claim 2, further comprising
   a second filter area that transmits light of a different wavelength band than the second wavelength band,
   wherein in a second direction that is different than a first direction representing a direction of the third distance, a position of a center of gravity of the first filter area is not in alignment with a position of a center of gravity of the second filter area.

5. The photographing device according to claim 4, wherein the first direction and the second direction are orthogonal to each other.

6. The photographing device according to claim 2, wherein the first distance calculating unit calculates the first distance based on the target image, which has a point symmetric point spread function, and the reference image, which has a point symmetric point spread function.

7. The photographing device according to claim 1, further comprising a correction information calculating unit that, based on the first distance, calculates correction information to be used in correcting a target image for correction, which is at least one of the reference image and the first image, in such a way that a positional relationship between the reference image and the first image becomes a particular relationship,
wherein the second distance calculating unit calculates the second distance based on the target image for correction that has been corrected according to the correction information.

8. The photographing device according to claim 1, wherein a size of aperture of the first image sensor is adjustable, and the aperture has origin symmetry at an arbitrary size.

9. The photographing device according to claim 1, wherein the second image sensor includes
a third sensor that receives light of the first wavelength band and outputs another target image, and
a fourth sensor that receives light of the second wavelength band and outputs another reference image.

10. The photographing device according to claim 1, wherein the object captured in the target image and the reference image is the object captured in the reference image and the first image.

11. The photographing device according to claim 1, wherein the second distance calculating unit performs stereo ranging to calculate the second distance.

12. A vehicle comprising:
a first image sensor that includes:
a first sensor that receives light of a first wavelength band and outputs a target image, and
a second sensor that receives light of a second wavelength band and outputs a reference image;
a first filter area that transmits a first light of a third wavelength band, which includes at least a part of the first wavelength band, the first light being a part of light incident on the first image sensor;
a second image sensor that outputs a first image; and
one or more hardware processors that, based on the target image and the reference image, calculate a first distance to an object captured in the target image and the reference image; based on the reference image and the first image, calculate a second distance to an object captured in the reference image and the first image; and control movement of the vehicle based on the first distance and the second distance.

13. A photographing device comprising:
a first image sensor that includes:
a first sensor that receives light of a first wavelength band and outputs a target image, and
a second sensor that receives light of a second wavelength band and outputs a reference image;
a first filter area that transmits a first light of a third wavelength band, which includes at least a part of the first wavelength band, the first light being a part of light incident on the first image sensor;
a second image sensor that outputs a first image;
one or more hardware processors that:
based on the target image and the reference image, calculate a first distance to an object captured in the target image and the reference image;
based on the reference image and the first image, calculate a second distance to an object captured in the reference image and the first image; and
based on the first distance and the second distance, determine and output a corrected distance.

14. The photographing device according to claim 13, wherein the one or more hardware processors further:
calculate the first distance according to a correlation between the target image and the reference image, and
calculate the second distance based on the reference image, based on the first image, and based on a third distance representing a distance between the first image sensor and the second image sensor.

15. The photographing device according to claim 14, wherein the one or more hardware processors calculate the first distance based on the target image, which has a point asymmetric point spread function, and the reference image.

16. The photographing device according to claim 14, further comprising
a second filter area that transmits light of a different wavelength band than the second wavelength band,
wherein in a second direction that is different than a first direction representing a direction of the third distance, a position of a center of gravity of the first filter area is not in alignment with a position of a center of gravity of the second filter area.

17. The photographing device according to claim 16, wherein the first direction and the second direction are orthogonal to each other.

18. The photographing device according to claim 14, wherein the one or more hardware processors calculate the first distance based on the target image, which has a point symmetric point spread function, and the reference image, which has a point symmetric point spread function.

19. The photographing device according to claim 13, wherein the one or more hardware processors further:
based on the first distance, calculate correction information to be used in correcting a target image for correction, which is at least one of the reference image and the first image, in such a way that a positional relationship between the reference image and the first image becomes a particular relationship, and
calculate the second distance based on the target image for correction that has been corrected according to the correction information.

20. The photographing device according to claim 13, wherein a size of aperture of the first image sensor is adjustable, and the aperture has origin symmetry at an arbitrary size.

21. The photographing device according to claim 13, wherein the second image sensor includes
a third sensor that receives light of the first wavelength band and outputs another target image, and
a fourth sensor that receives light of the second wavelength band and outputs another reference image.

22. The photographing device according to claim 13, wherein the object captured in the target image and the reference image is the object captured in the reference image and the first image.

23. The photographing device according to claim 13, wherein the one or more hardware processors further perform stereo ranging to calculate the second distance.

* * * * *